US012267774B2

(12) United States Patent
Starsinic et al.

(10) Patent No.: US 12,267,774 B2
(45) Date of Patent: Apr. 1, 2025

(54) METHODS, ARCHITECTURES, APPARATUSES AND SYSTEMS FOR SUPPORTING NETWORK SLICING SERVING AREA

(71) Applicant: InterDigital Patent Holdings, Inc., Wilmington, DE (US)

(72) Inventors: Michael Starsinic, Newtown, PA (US); Samir Ferdi, Kirkland (CA); Saad Ahmad, Montreal (CA); Ulises Olvera-Hernandez, Saint-Lazare (CA); Anuj Sethi, Ottawa (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/783,768

(22) Filed: Jul. 25, 2024

(65) Prior Publication Data
US 2024/0381240 A1  Nov. 14, 2024

Related U.S. Application Data

(63) Continuation of application No. PCT/US2023/011308, filed on Jan. 23, 2023.
(Continued)

(51) Int. Cl.
*H04W 48/18* (2009.01)
*H04W 48/08* (2009.01)
*H04W 60/04* (2009.01)

(52) U.S. Cl.
CPC ........... *H04W 48/18* (2013.01); *H04W 48/08* (2013.01); *H04W 60/04* (2013.01)

(58) Field of Classification Search
CPC ...... H04W 48/18; H04W 48/08; H04W 60/04
(Continued)

(56) References Cited

U.S. PATENT DOCUMENTS

2024/0073848 A1* 2/2024 Ryu ............... H04W 36/08

FOREIGN PATENT DOCUMENTS

WO   WO 2021200234 A1   10/2021

OTHER PUBLICATIONS

"3rd Generation Partnership Project; Technical Specification Group Services and System Aspects; System architecture for the 5G System (5GS); Stage 2, (Release 17)", 3GPP TS 23.501 V17.3.0, Dec. 2021, 559 pages.
(Continued)

*Primary Examiner* — Huy C Ho
(74) *Attorney, Agent, or Firm* — Jamie T. Nguyen

(57) ABSTRACT

Procedures, methods, architectures, apparatuses, systems, devices, and computer program products for a wireless transmit/receive unit (WTRU) to determine slice availability in tracking areas (TAs) of a registration area (RA). In a representative example, the WTRU may use determined slice availability to detect changes in slice availability among different TAs. For example, the WTRU may move from a first TA of a RA where access to a first slice is unavailable to a second TA of the RA where access to the first slice is available. The WTRU may receive information during a registration procedure in the first TA that indicates the first slice is available in less than all TAs of the RA. Upon moving to the second TA, the WTRU may (e.g., again) perform a registration procedure in the second TA of the RA in order to access the first slice in the second TA.

20 Claims, 11 Drawing Sheets

Related U.S. Application Data

(60) Provisional application No. 63/303,574, filed on Jan. 27, 2022.

(58) Field of Classification Search
USPC .......................................................... 455/434
See application file for complete search history.

(56) References Cited

OTHER PUBLICATIONS

ZTE: "KI#6 New Sol#X: Support registration for incompatible network slice(s) in UE's current serving RA or different one", 3GPP Tdoc S2-2006519, 3GPP TSG-SA WG2 Meeting #140e, XX—XX XXXX, 2020, 7 pages.
"LS on Slice list and priority information for cell reselection", 3GPP Tdoc R2-2108928, 3GPP TSG RAn WG2#115-e, e-Meeting, Aug. 9-27, 2021, 2 pages.
"3rd Generation Partnership Project; Technical Specification Group Core Network and Terminals; Non-Access-Stratum (NAS) protocol for 5G System (5GS); Stage 3; (Release 17)", 3GPP TS 24.501 V17.5.0, Dec. 2021, 916 pages, Parts 1-5.
Interdigital Inc.; "KI#3, New Solution: Enabling Flexible RAs with Slice Service Area", 3GPP Tdoc S2-2204581, SA WG2 Meeting #150e, Apr. 6-12, 2022, Electronic Meeting, 4 pages.

* cited by examiner

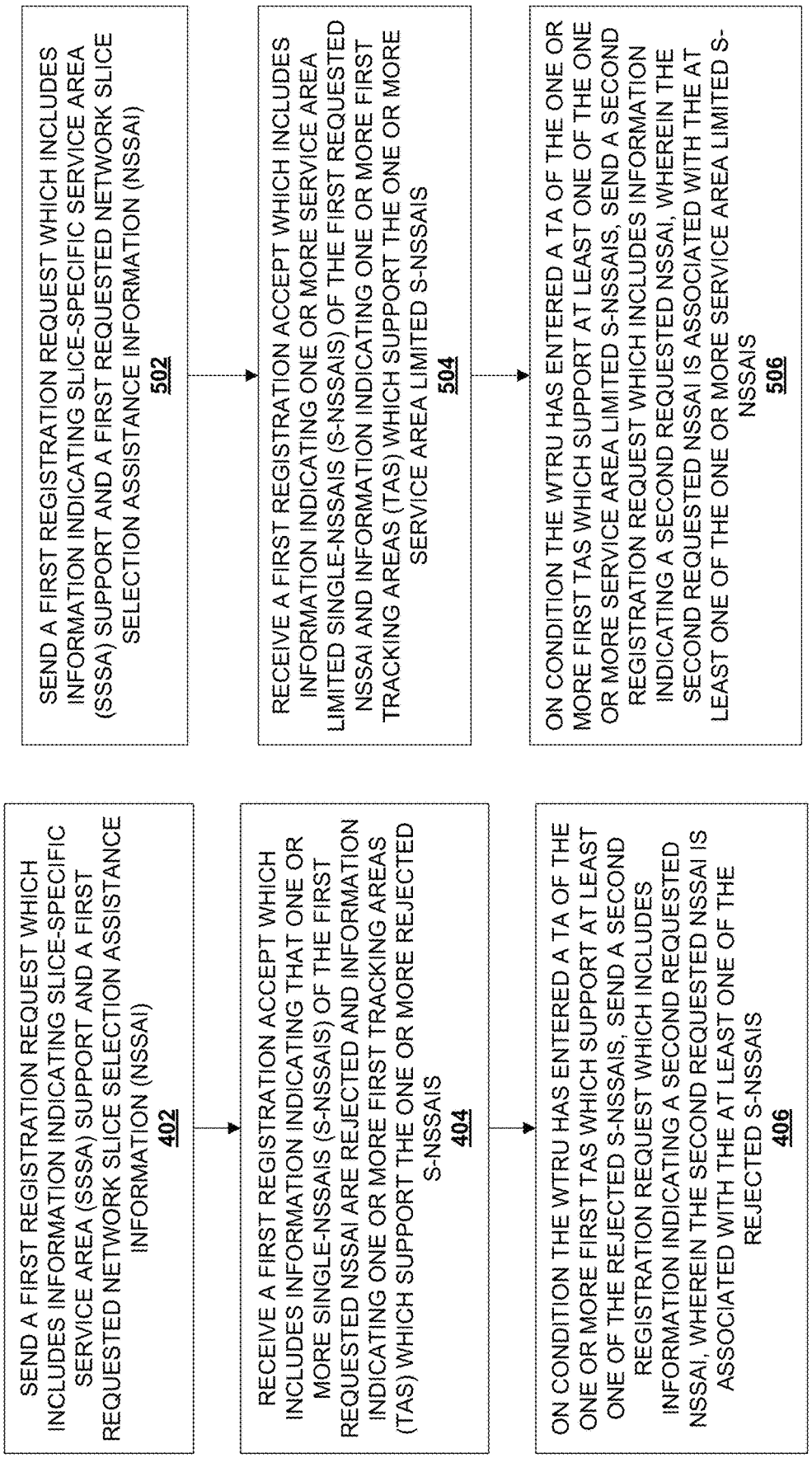

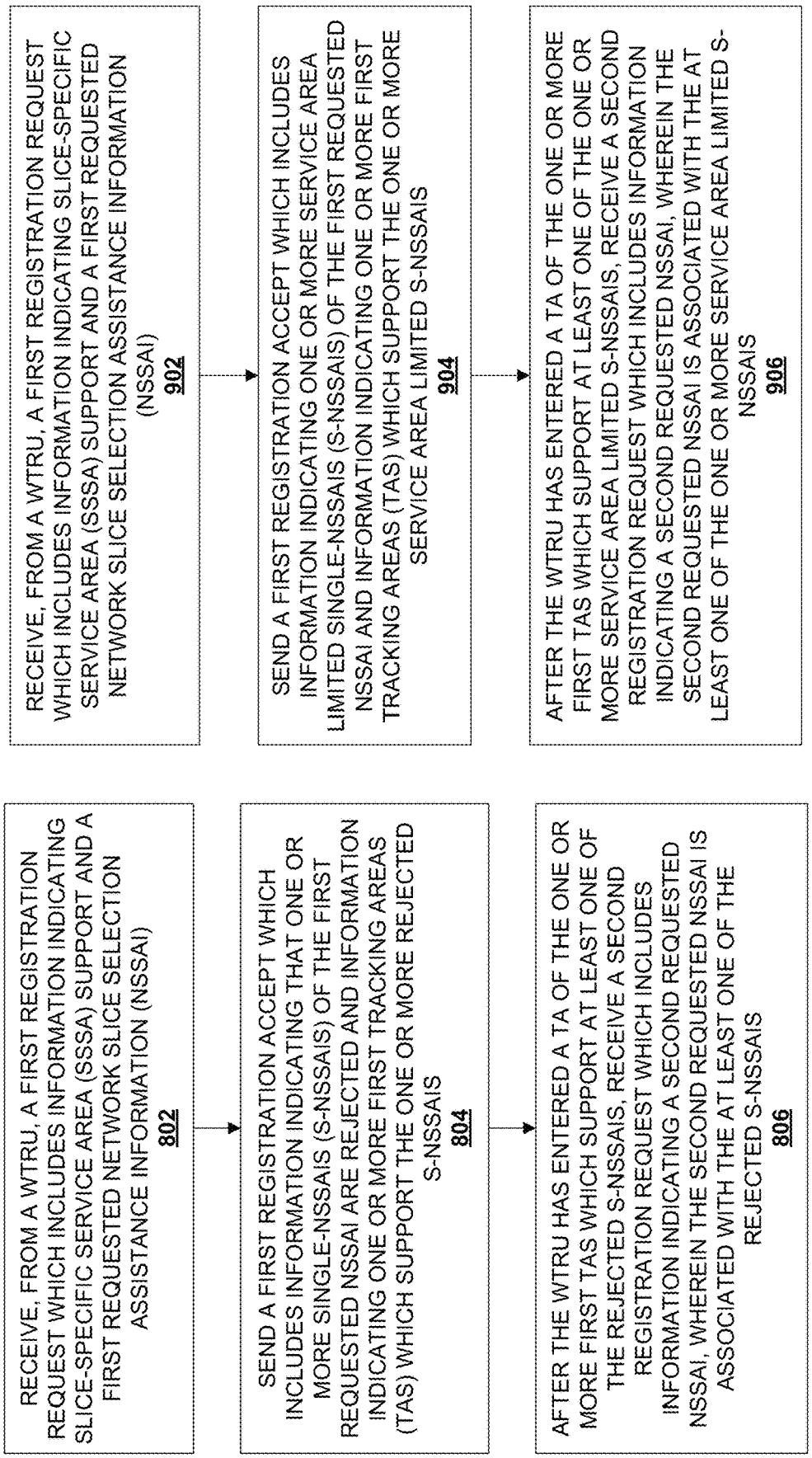

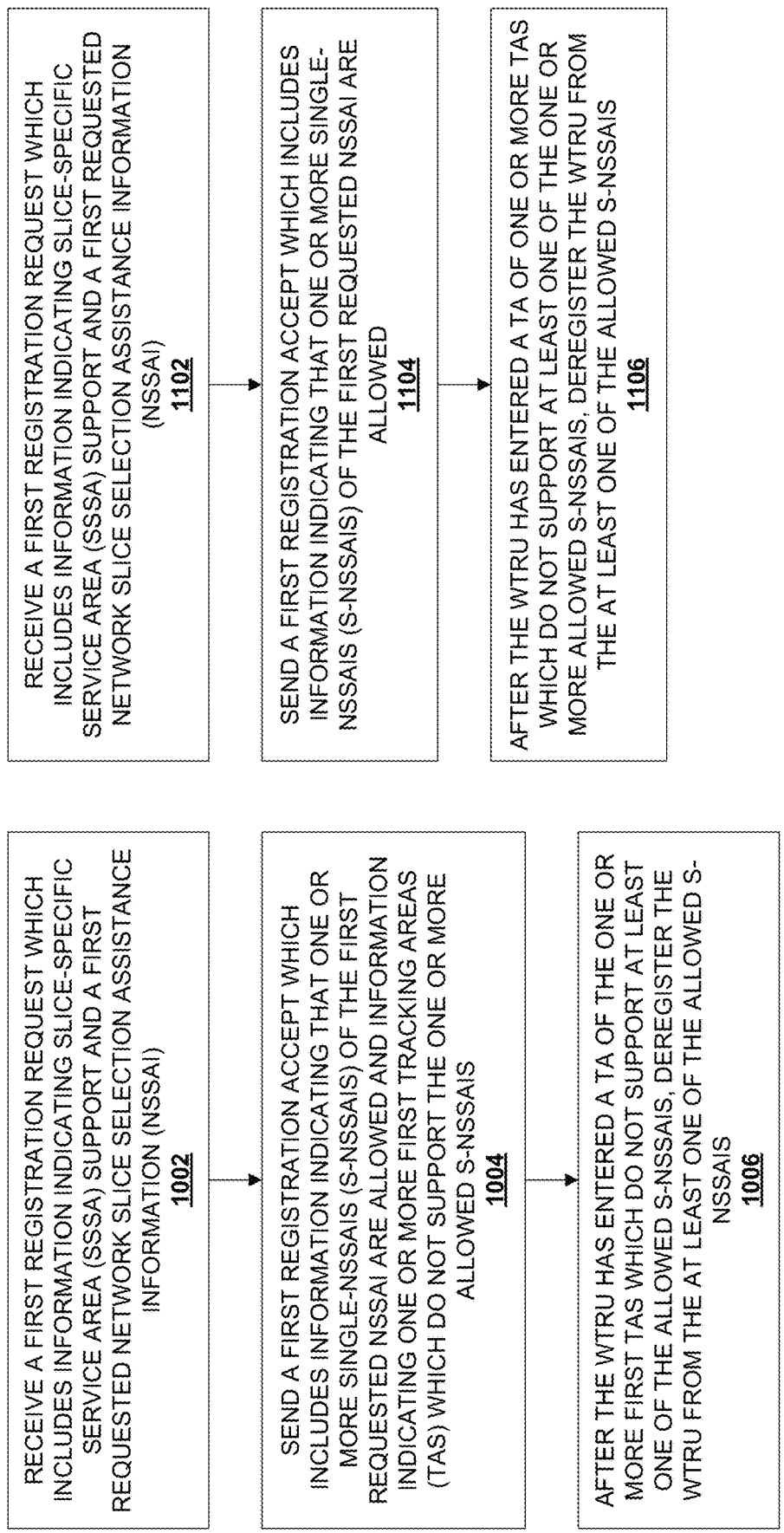

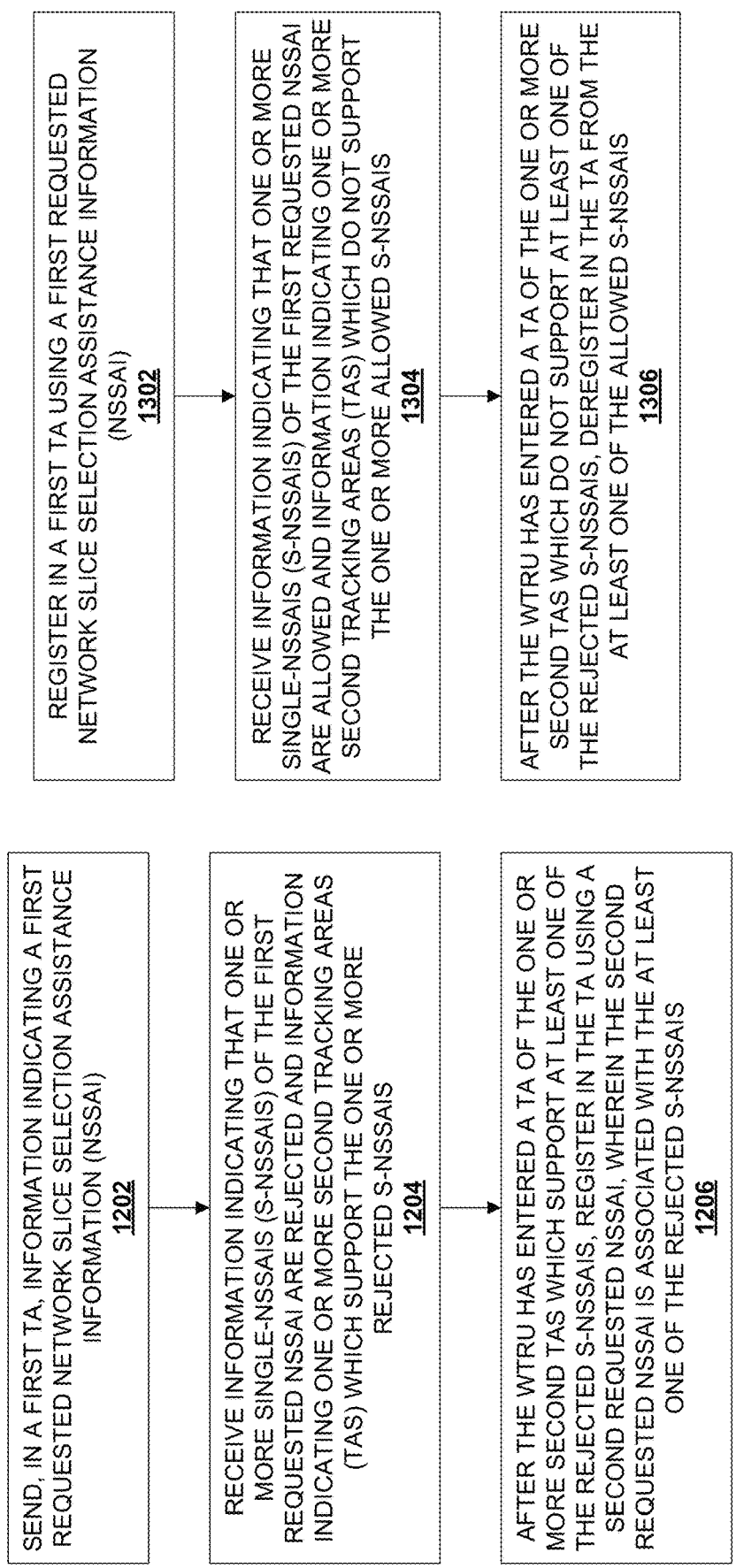

METHODS, ARCHITECTURES, APPARATUSES AND SYSTEMS FOR SUPPORTING NETWORK SLICING SERVING AREA

CROSS-REFERENCE TO RELATED APPLICATIONS

This application is a Continuation of International Patent Application No. PCT/US2023/011308, filed Jan. 23, 2023, which claims the benefit of U.S. Provisional Patent Application No. 63/303,574 filed 27 Jan. 2022, which is incorporated herein by reference.

TECHNICAL FIELD

The present disclosure is generally directed to the fields of communications, software and encoding, including, for example, to methods, architectures, apparatuses, systems directed to network slicing and mobility management.

SUMMARY

In certain representative embodiments, a wireless transmit/receive unit (WTRU) be configured to perform (e.g., implement a method) acts which include sending (e.g., to a network entity) a first registration request message associated with a first tracking area (TA) of a registration area (RA). For example, the first registration request may include (1) information indicating a set of slices which are requested by the WTRU. The WTRU may receive (e.g., from the network entity) a first registration accept message which may include (1) information indicating that a first slice of the set of slices is rejected and (2) slice-specific service area (SSSA) information indicating at least one second TA of the RA where the first slice is available. On condition that (e.g., after) the WTRU received the SSSA and the WTRU has entered the at least one second TA, the WTRU may send (e.g., to a network entity), a second registration request message associated with the second TA of the RA. For example, the second registration request may include (1) information indicating at least the first slice of the set of slices is requested by the WTRU. The WTRU may further receive (e.g., from the network entity) a second registration accept message which may include (1) information indicating that the first slice of the set of slices is permitted to be accessed by the WTRU in the second TA.

In certain representative embodiments, the information indicating the set of slices which are requested by the WTRU may be provided as network slice selection assistance information (NSSAI).

In certain representative embodiments, the RA includes at least the first and second TAs.

In certain representative embodiments, the information indicating that the first slice of the set of slices is rejected may be provided as a single NSSAI (S-NSSAI).

In certain representative embodiments, the SSSA information may indicate that the first slice is accessible in TAs of the RA other than the first TA.

In certain representative embodiments, the first registration accept message may include a slice rejection cause code that indicates that the first slice is rejected only for the current TA and not for the entire RA.

In certain representative embodiments, the first registration accept message may include a service-area-limited NSSAI information element which indicates one or more of the slices of the set are accessible in less than all TAs of the RA.

In certain representative embodiments, the first registration request message may include information indicating that the WTRU understands or is capable of receiving SSSA information.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures (FIGS.) and the detailed description are not to be considered limiting, and other equally effective examples are possible and likely. Furthermore, like reference numerals ("ref.") in the FIGS. indicate like elements, and wherein:

FIG. 4 is a procedural diagram illustrating an example procedure for slice registration;

FIG. 5 is a procedural diagram illustrating another example procedure for slice registration;

FIG. 8 is a procedural diagram illustrating an example procedure for slice registration;

FIG. 9 is a procedural diagram illustrating another example procedure for slice registration;

FIG. 10 is a procedural diagram illustrating an example procedure for slice deregistration;

FIG. 11 is a procedural diagram illustrating another example procedure for slice deregistration;

FIG. 12 is a procedural diagram illustrating another example procedure for slice registration; and FIG. 13 is a procedural diagram illustrating another example procedure for slice deregistration.

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein. Although various embodiments are described and/or claimed herein in which an apparatus, system, device, etc. and/or any element thereof carries out an operation, process, algorithm, function, etc. and/or any portion thereof, it is to be understood that any embodiments described and/or claimed herein assume that any apparatus, system, device, etc. and/or any element thereof is configured to carry out any operation, process, algorithm, function, etc. and/or any portion thereof.

Example Communications System

The methods, apparatuses and systems provided herein are well-suited for communications involving both wired and wireless networks. An overview of various types of wireless devices and infrastructure is provided with respect to FIGS. 1A-ID, where various elements of the network may utilize, perform, be arranged in accordance with and/or be adapted and/or configured for the methods, apparatuses and systems provided herein.

Figure 1A:
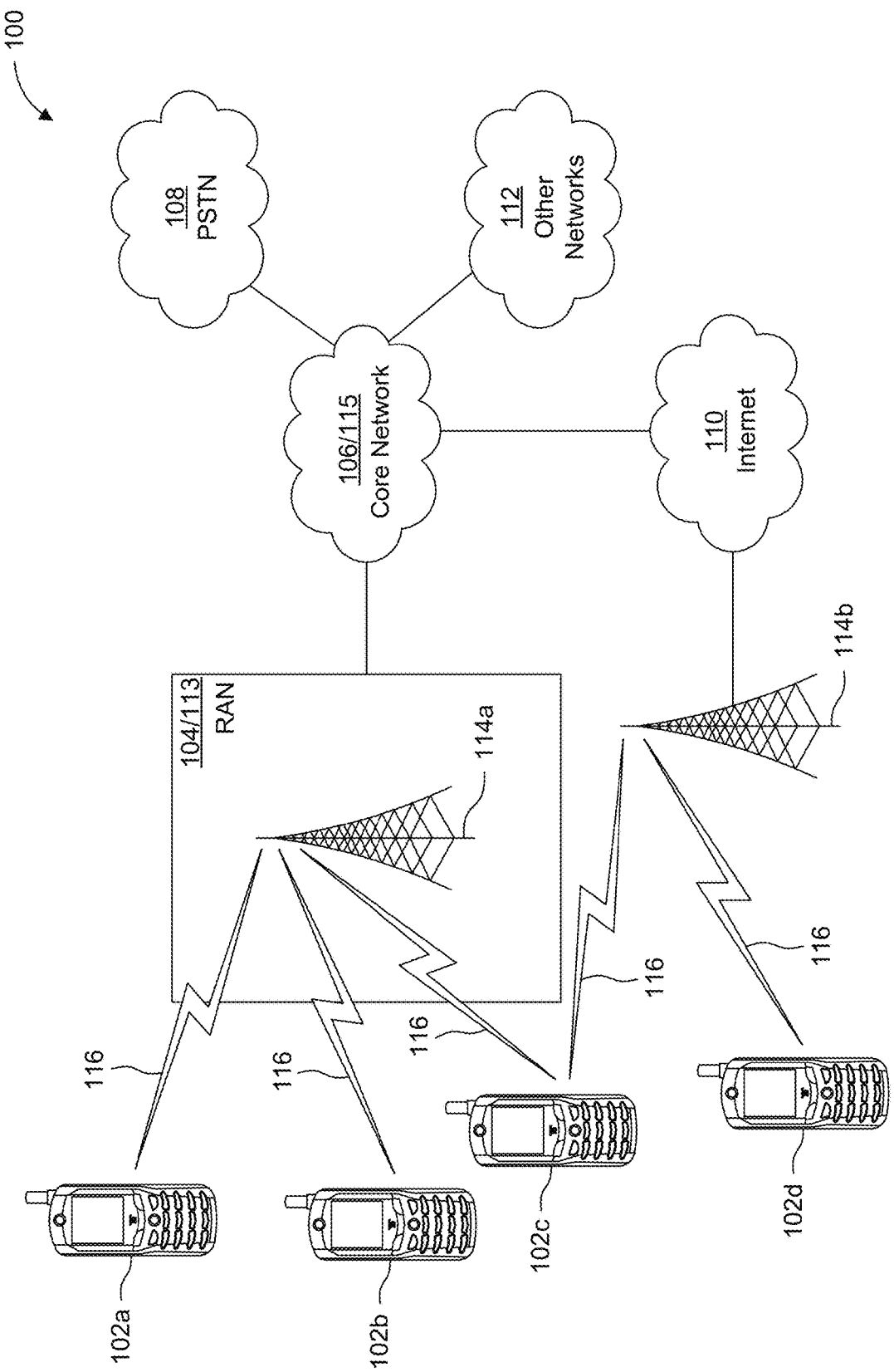
FIG. 1A is a system diagram illustrating an example communications system.

FIG. 1A is a system diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail (ZT) unique-word (UW) discreet Fourier transform (DFT) spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104/113, a core network (CN) 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include (or be) a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d, e.g., to facilitate access to one or more communication networks, such as the CN 106/115, the Internet 110, and/or the networks 112. By way of example, the base stations 114a, 114b may be any of a base transceiver station (BTS), a Node-B (NB), an eNode-B (eNB), a Home Node-B (HNB), a Home eNode-B (HeNB), a gNode-B (gNB), a NR Node-B (NR NB), a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in an embodiment, the base station 114a may include three transceivers, i.e., one for each sector of the cell. In an embodiment, the base station 114a may employ multiple-input multiple output (MIMO) technology and may utilize multiple transceivers for each or any sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In an embodiment, the base station 114a and the WTRUs 102a, 102b, 102c may implement radio technologies such as IEEE 802.11 (i.e., Wireless Fidelity (Wi-Fi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node-B, Home eNode-B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In an embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In an embodiment, the base station 114b and the WTRUs 102c, 102d may utilize a cellular-based RAT (e.g., WCDMA, CDMA2000, GSM, LTE, LTE-A, LTE-A Pro, NR, etc.) to establish any of a small cell, picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VOIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing an NR radio technology, the CN 106/115 may also be in communication with another RAN (not shown) employing any of a GSM, UMTS, CDMA 2000, WiMAX, E-UTRA, or Wi-Fi radio technology.

The CN 106/115 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/114 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
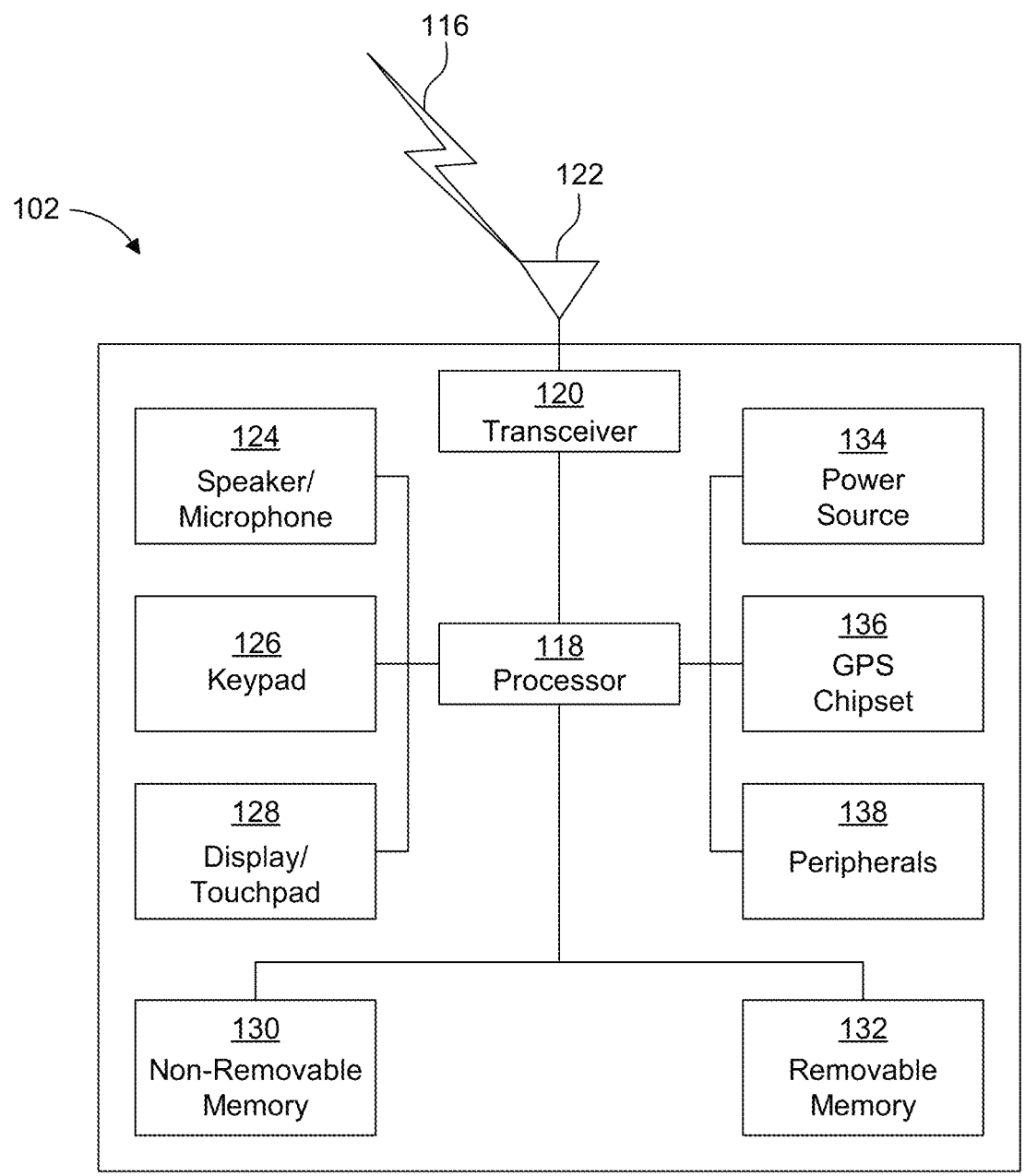
FIG. 1B is a system diagram illustrating an example wireless transmit/receive unit (WTRU) that may be used within the communications system illustrated in FIG. 1A.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other elements/peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together, e.g., in an electronic package or chip.

The transmit/receive element 122 may be configured to transmit signals to, or receive signals from, a base station (e.g., the base station 114a) over the air interface 116. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In an embodiment, the transmit/receive element 122 may be configured to transmit and/or receive both RF and light signals.

It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. For example, the WTRU 102 may employ MIMO technology. Thus, in an embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other elements/peripherals 138, which may include one or more software and/or hardware modules/units that provide additional features, functionality and/or wired or wireless connectivity. For example, the elements/peripherals 138 may include an accelerometer, an e-compass, a satellite transceiver, a digital camera (e.g., for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a virtual reality and/or augmented reality (VR/AR) device, an activity tracker, and the like. The elements/peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the uplink (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the uplink (e.g., for transmission) or the downlink (e.g., for reception)).

Figure 1C:
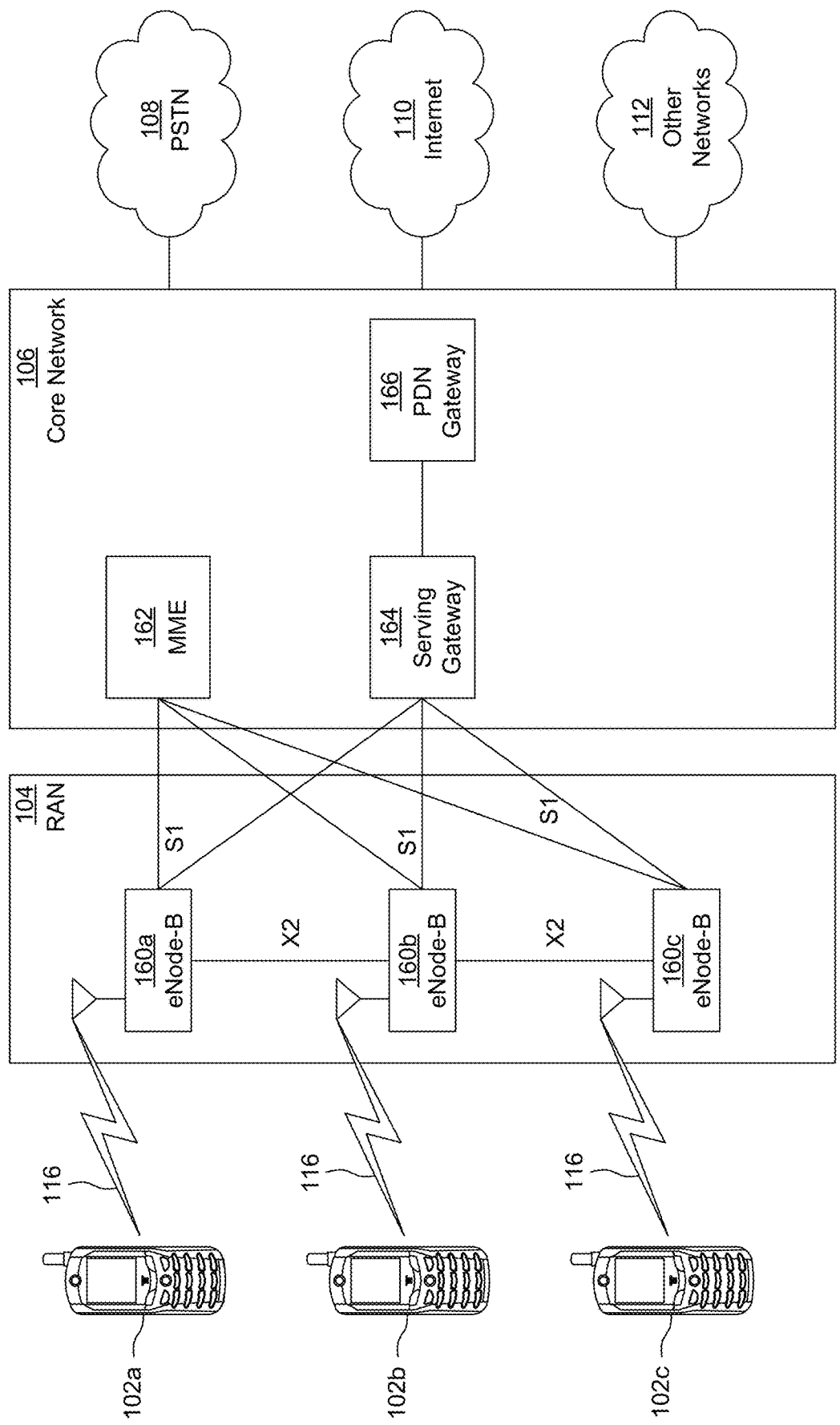
FIG. 1C is a system diagram illustrating an example radio access network (RAN) and an example core network (CN) that may be used within the communications system illustrated in FIG. 1A.

FIG. 1C is a system diagram illustrating the RAN 104 and the CN 106 according to an embodiment. As noted above, the RAN 104 may employ an E-UTRA radio technology to communicate with the WTRUs 102a, 102b, and 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink (UL) and/or downlink (DL), and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While each of the foregoing elements are depicted as part of the CN 106, it will be appreciated that any one of these elements may be owned and/or operated by an entity other than the CN operator.

The MME 162 may be connected to each of the eNode-Bs 160a, 160b, and 160c in the RAN 104 via an SI interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode-Bs 160a, 160b, 160c in the RAN 104 via the SI interface. The SGW 164 may generally route and forward user data packets to/from the WTRUs 102a, 102b, 102c. The SGW 164 may perform other functions, such as anchoring user planes during inter-eNode-B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-ID as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in infrastructure basic service set (BSS) mode may have an access point (AP) for the BSS and one or more stations (STAs) associated with the AP. The AP may have an access or an interface to a distribution system (DS) or another type of wired/wireless network that carries traffic into and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier sense multiple access with collision avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High throughput (HT) STAs may use a 40 MHz wide channel for communication, for example, via a combination of the primary 20 MHz channel with an adjacent or nonadjacent 20 MHz channel to form a 40 MHz wide channel.

Very high throughput (VHT) STAs may support 20 MHz, 40 MHz, 80 MHz, and/or 160 MHz wide channels. The 40 MHz, and/or 80 MHZ, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse fast fourier transform (IFFT) processing, and time domain processing, may be done on each stream separately. The streams may be mapped on to the two 80 MHz channels, and the data may be transmitted by a transmitting STA. At the receiver of the receiving STA, the above-described operation for the 80+80 configuration may be reversed, and the combined data may be sent to a medium access control (MAC) layer, entity, etc.

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV white space (TVWS) spectrum, and 802.11ah supports 1 MHZ, 2 MHZ, 4 MHZ, 8 MHz, and 16 MHz bandwidths using non-TVWS spectrum. According to a representative embodiment, 802.11ah may support meter type control/machine-type communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or network allocation vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
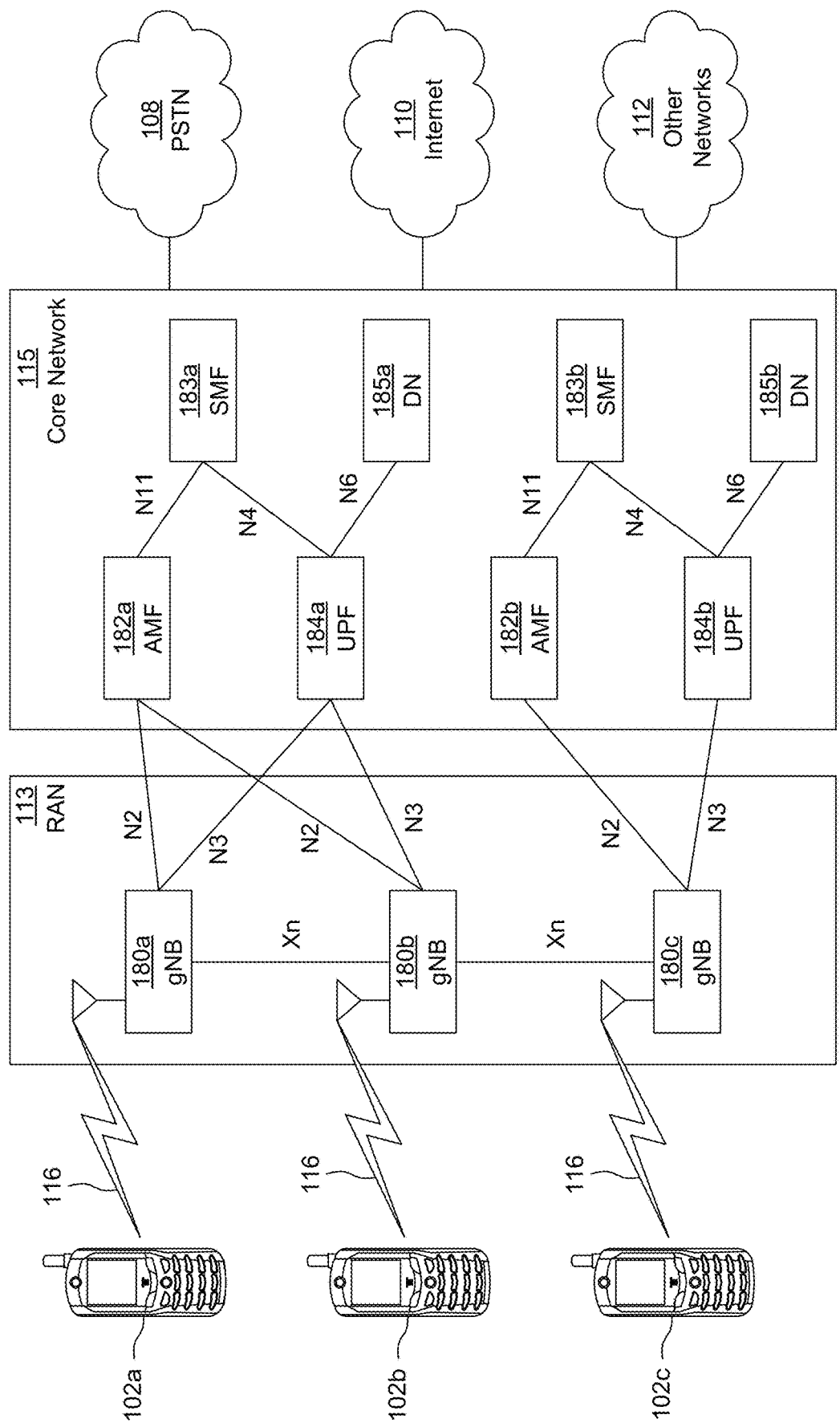
FIG. 1D is a system diagram illustrating a further example RAN and a further example CN that may be used within the communications system illustrated in FIG. 1A.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In an embodiment, the gNBs 180a, 180b, 180c may implement MIMO technology. For example, gNBs 180a, 180b may utilize beamforming to transmit signals to and/or receive signals from the WTRUs 102a, 102b, 102c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., including a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards user plane functions (UPFs) 184a, 184b, routing of control plane information towards access and mobility management functions (AMFs) 182a, 182b, and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one session management function (SMF) 183a, 183b, and at least one Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of NAS signaling, mobility management, and the like. Network slicing may be used by the AMF 182a, 182b, e.g., to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (cMBB) access, services for MTC access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as Wi-Fi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, e.g., to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In an embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to any of: WTRUs 102a-d, base stations 114a-b, eNode-Bs 160a-c, MME 162, SGW 164, PGW 166, gNBs 180a-c, AMFs 182a-b, UPFs 184a-b, SMFs 183a-b, DNs 185a-b, and/or any other element(s)/device(s) described herein, may be performed by one or more emulation elements/devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

INTRODUCTION

For reference, the following acronyms may be used throughout the disclosure:
AMF Access and Mobility Function
MM Mobility Management
NAS Non-Access Stratum
NSSAI Network Slice Selection Assistance Information
PDU Protocol Data Unit
PMF Performance Management Functionality
RA Registration Area
RAN Radio Access Network
RRC Radio Resource Control
SM Session Management
SMF Session Management Function
S-NSSAI Single NSSAI
SSSA Slice-Specific Serving Area
TA Tracking Area
UDM User Data Management
UDR User Data Repository
UE User Equipment
UPF User Plane Function In certain representative embodiments, a WTRU 102 may receive information from a network, such as the network 104/113, and the WTRU 102 may perform procedures to determine slice availability in a TA using such received information. When the WTRU 102 registers with the network, the WTRU 102 may provide an (explicit or implicit) indication to the network that the WTRU 102 may understand Slice-Specific Service Area (SSSA) information (e.g., perform procedures using the SSSA information). An AMF 182 may use the information from the WTRU 102 in determining how to construct a RA, such as whether or not to include TAs in the RA where a rejected slice is available. The network may send information to the WTRU 102 so that it can be determined whether or not a slice is available in a TA. For example, the WTRU 102 may receive SSSA information from the network in a Registration Accept Message. For example, the WTRU 102 may receive (e.g., also) receive slice group information which may be used to detect availability based on broadcasted information. As an example, the network may send a Service-Area-Limited NSSAI to the WTRU 102. The Service-Area-Limited NSSAI may include, be and/or indicate a list of slices that are only available in some (e.g., one or more) TAs of the RA. The Service-Area-Limited NSSAI may be associated with SSSA information.

In certain representative embodiments, a WTRU 102 and/or a network, such as network 104/113, may use slice availability information to detect a change in slice availability. For example, a WTRU 102 may use SSSA information (e.g., received during registration) to check slice availability when there is a TA change. The WTRU 102 may use the slice group information to detect availability based on broadcasted information. For example, an AMF 182 may use a location report from a RAN (e.g., gNB) to detect that slice availability has changed for a WTRU 102 and the AMF may notify the WTRU 102 of the same.

In certain representative embodiments, a change in slice availability may trigger a WTRU 102 and/or a network, such as network 104/113, to take an action. As an example, a WTRU 102 may send a (e.g., new) Registration Request to the network and add a rejected S-NSSAI to the requested NSSAI (e.g., because the associated slice is now available). As an example, a WTRU 102 may send a (e.g., new) Registration Request to the network and may remove an S-NSSAI from its Requested NSSAI (i.e. because the associated slice is now unavailable). For example, a WTRU 102 may receive a NAS Message from an AMF 182. The NAS Message may be a UE Configuration Update Command that, for example, includes information indicating to add a Rejected S-NSSAI to the Allowed NSSAI (e.g., because it is now available). As another example, the NAS Message may be a NAS notification that includes information indicating a previously Rejected S-NSSAI is now accessible. As another example, the NAS Message may be a UE Configuration Update Command that removes an S-NSSAI from its Allowed NSSAI (e.g., because it is now unavailable).

Overview

Slicing, Tracking Areas and Registration Areas

In certain representative embodiments, a Registration Area (RA) may refer to a set of Tracking Areas (TAs). A RA may be defined by a Tracking Area Identifier (TAI) List (e.g., a list of TAs). When a WTRU 102 registers with the network (e.g., sends a registration request to an AMF 182), an AMF 182 may allocate a registration area (e.g., a set of tracking areas in a TAI List) to the WTRU 102. For example, the AMF 182 may take information, such as the WTRU's expected mobility pattern, into account when allocating the TAI list.

In certain representative embodiments, a Configured NSSAI may be or include information indicating a list, or collection, of slices that a WTRU 102 may access. Any WTRU 102 may receive a Configured NSSAI in a message, such as a Registration Accept and/or WTRU Configuration Update message.

In certain representative embodiments, a requested NSSAI may be or include information indicating a list, or collection, of slices that a WTRU 102 sends to the network in order to request to register with the slices in the list. The WTRU 102 may send a Requested NSSAI to the network in a Registration Request message.

In certain representative embodiments, an allowed NSSAI may be or include information indicating a list, or collection, of slices that a WTRU 102 may access in the WTRU's RA. For example, the list of slices includes slices that the WTRU 102 may use in the WTRU's RA.

In certain representative embodiments, a rejected S-NSSAI may be an information element that the network may send to a WTRU 102 in a Registration Accept and/or a WTRU Configuration Update message.

In certain representative embodiments, a rejected S-NSSAI may be a slice that the WTRU 102 includes and/or indicates in a Requested NSSAI, and that the network determined the WTRU 102 may not access.

In certain representative embodiments, as described herein, the phrases "attempting to register with a slice" and "including a slice in a Requested NSSAI" may be interchangeably.

In certain representative embodiments, as described herein, the terms "slice" and "S-NSSAI" may be used interchangeably.

As those skilled in the art will understand, 3GPP TS 23.501 describes that S-NSSAIs which the WTRU 102 provides in a Requested NSSAI which are neither in the Allowed NSSAI nor provided as a rejected S-NSSAI, shall, not be regarded as rejected by the WTRU 102. For example, the WTRU 102 may request to register these S-NSSAIs again the next time the WTRU 102 sends a Requested NSSAI to the network.

NG-RAN Location Reporting

As those skilled in the art will understand, 3GPP TS 23.50 describes that an AMF 182 may request that a RAN node sends location reports about a WTRU 102 to the AMF 182. If the AMF 182 requests WTRU location information, a RAN node may report a current location of the WTRU 102 based on a requested reporting parameter (e.g., one-time reporting or continuous reporting).

If the AMF 182 requests reports about a WTRU's presence in an Area Of Interest, the RAN node may report the WTRU location and/or an indication (e.g., IN, OUT or UNKNOWN) when the RAN node determines a change of WTRU 102 presence in Area Of Interest.

Slice Groups

As those skilled in the art will understand, 3GPP RP-2108928 describes that a slice group may consist of one or multiple slices and each slice group may be uniquely identified by a Slice Group Identifier.

In certain representative embodiments, a NG-RAN cell may broadcast slice group information indicating what slices the cell supports. For example, slice group identifiers may indicate what slices the cell supports. For example, an NG-RAN cell may use RRC messaging to provide slice group information to a WTRU 102 as a way of indicating what slices the cell supports. As another example, the network may use NAS signaling to provide information to the WTRU 102 so that the WTRU 102 can determine what slices (e.g., S-NSSAI's) are associated with a Slice Group Identifier.

PMF Protocol

In certain representative embodiments, the PMF protocol may be used by the WTRU 102 and a PMF to exchange messages that relate to Round Trip Time (RTT) measurements, Packet Loss Rate (PLR) measurements, Access availability/unavailability information, and/or WTRU-assistance data. Access availability/unavailability information may refer to a report that is sent from the WTRU 102 to the PMF to indicate whether or not cellular and/or non-3GPP access is available for the WTRU 102.

As described in 3GPP TS 23.501 Ver. 17.3.0, the availability of a Network Slice is configured in the network per TA. Network functions, such as the AMF 182, are configured to know, on a per-TA basis, whether a slice (e.g., S-NSSAI) is accessible. The AMF 182 is informed by 5G-AN nodes of the S-NSSAIs supported per TA when the 5G-AN nodes establish or update the N2 connection with the AMF 182.

3GPP TS 23.501 Ver. 17.3.0 also describes that a WTRU 102 shall not include in the Requested NSSAI any S-NSSAI that is currently rejected by the network (e.g., rejected in the current registration area or rejected in the PLMN). If a WTRU 102 attempts to register to a slice while in a TA where the slice is not supported, then the network will indicate to the WTRU 102 that the S-NSSAI is rejected. This indication may be sent in a Rejected S-NSSAI information element and delivered in a Registration Accept message. The Rejected S-NSSAI information element includes a cause indication to indicate to the WTRU 102 why the S-NSSAI was rejected. The Rejected S-NSSAI information element is specified in 3GPP TS 24.501 Ver. 17.5.0 and allows the network to indicate one of three rejection causes to the WTRU 102. The first rejection cause indicates that the S-NSSAI is not available in the current PLMN or SNPN. The second rejection cause indicates that the S-NSSAI is not available in the current registration area. The third rejection cause indicates that the S-NSSAI not available due to failed or revoked network slice-specific authentication and authorization.

One problem with such an approach is that the network can reject an S-NSSAI with RA granularity but not TA granularity. Thus, when the WTRU 102 requests an S-NSSAI that is not accessible in the TA, the current 5G System provides only two options for how to handle the situation.

The first option is that an AMF 182 may provide the WTRU 102 with an RA that only includes TAs where the rejected S-NSSAI is inaccessible. From a WTRU perspective, this solution would present no problems. However, this approach may not be desirable for a network operator. For example, this option may not be desirable for a network operator because it forces the AMF to configure Registration Areas based on slice availability and/or complicates formation of the Registration Area. In particular, forcing an AMF 182 to reduce the size of the RA (e.g., form a reduced set of TAs in TAI list) is not desirable as it may incur signaling overhead due to a non-optimal RA for the S-NSSAIs that are allowed. Formation of the RA may be even more complicated if multiple slices are rejected in the WTRU's current TA but also have some non-overlapping availability.

The second option is for the AMF to provide the WTRU 102 with an RA that includes one or more TAs where the rejected S-NSSAI is accessible. From a WTRU perspective, this solution may present problems. For example, a problem with this approach is that the WTRU 102 will only be told the S-NSSAI is rejected in the Registration Area and current 5G System design specifies that the WTRU 102 may not attempt to register with the slice anywhere in the RA, even if the slice is accessible in some other TA of the RA. With this option, the WTRU 102 would be prevented from registering with the slice in some TAs where it should be accessible.

Hence, the situation described above leaves a network operator to choose between telling a WTRU 102 that a slice cannot be accessed in some TAs where it should be accessible or forming complicated RAs.

In certain representative embodiments described herein, a wireless system, such as a 5G System, may be enhanced such that a WTRU 102 is able to request an S-NSSAI that was rejected in a first TA of the RA but may be available in another TA of the RA. In certain representative embodiments, backwards compatibility with existing systems will be considered.

In certain representative embodiments described herein, a WTRU 102 may receive information from a network that will be used by the WTRU 102 to determine slice availability in a TA. For example, such information may be used to detect a change in slice availability and/or to trigger actions when the WTRU 102 detects a change in slice availability.

Receiving Information about Slice Availability

In certain representative embodiments, a WTRU 102 may send a Registration Request to an AMF 182. For example, the WTRU 102 may include a Slice-Specific Service Area (SSSA) information support indication in the Registration Request. The SSSA information support indication may indicate to the network that the WTRU 102 is capable of receiving and understanding the contents of an Information Element that contains SSSA information. For example, the SSSA information support indication may be sent in a NAS-MM part of the Registration Request. As an example, the SSSA information support indication may be encoded in an information element, such as a UE 5GMM Core Network Capability information element.

In certain representative embodiments, a WTRU 102 may receive SSSA information in a Registration Accept Message. For example, the SSSA information may be stored in a NAS-MM information element and be encoded such that it includes one or more slice identifiers (e.g., S-NSSAIs) and a set of TAs that belong to the RA. The set of TAs may be TAs in the Registration Area where the slices (e.g., S-NSSAIs) are available to the WTRU 102. For example, on condition that the WTRU 102 receives no SSSA information for a slice that is in the WTRU's configured NSSAI, the WTRU 102 may interpret the missing SSSA information as an indication that the slice is available to the WTRU 102 in all tracking areas of the RA. As another example, the set of TAs may be the tracking areas in the RA where the slices (e.g., S-NSSAIs) are not available to the WTRU 102 (e.g., the slice is available in all other tracking areas of the Registration Area).

In certain representative embodiments, the network (e.g., an AMF 182) may also send the WTRU 102 new and/or updated SSSA information in a message, such as a Configuration Update Command message. For example, the AMF 182 may be triggered to send the message when updated slice configuration information is received, such as from an OAM system, and/or when updated WTRU 102 subscription information is received, such as from a UDM and/or UDR.

In certain representative embodiments, SSSA information may include information that the WTRU 102 may use to obtain connectivity to a network, such as via a non-3GPP connection to the 5G system. For example, SSSA information may include an evolved Packet Data Gateway (ePDG) identifier configuration, Non-3GPP Interworking Function (N3IWF) identifier configuration, and/or Non-3GPP access node selection information. The identified N3IWF or PDG may be used to obtain connectivity to a network slice. Including information that can be used to obtain non-3GPP connectivity to a network slice may help the WTRU 102, such as when the WTRU 102 determines that it is in a TA where a desired network slice is not available. For example, when the WTRU 102 detects that a network slice is not available in a TA, it may use information from the SSSA information to obtain non-3GPP connectivity to the 5G System and register with the network slice.

Detecting Slice Availability—Example 1

In certain representative embodiments, a WTRU 102 may be configured with a Configured NSSAI. The Configured NSSAI may include a set, or list, of slices (e.g., S-NSSAIs) that the WTRU 102 may attempt to register to. When the WTRU 102 sends a Registration Request to an AMF, the WTRU 102 may provide a Requested NSSAI information element which lists the slices (e.g., S-NSSAIs) that the WTRU 102 wants to register to. One or more of the slices (e.g., S-NSSAIs) in the Requested NSSAI may not be available to the WTRU 102 in the WTRU's current TA.

A Registration Area may be a set of Tracking areas. An AMF 182 may determine that it is efficient to define a RA for the WTRU 102 that includes some TAs where slices of the WTRU's Configured NSSAI are not available and other TAs where the same slices of the WTRU's Configured NSSAI are available. For example, a slice-X may be in the WTRU's configured NSSAI and the WTRU's RA may include some TAs where the slice-X is available and some TAs where the slice-X is not available.

The WTRU 102 may send a Registration Request to an AMF 182. The Registration Request may include a Requested NSSAI and one or more of the slices in the Requested NSSAI may not be available in the WTRU's current TA. The AMF 182 may respond to the Registration Request by sending a Registration Accept Message. The Registration Accept Message may indicate to the WTRU 102 that registration to one or more slices that are not available in the WTRU's current TA is not accepted. As described in 3GPP TS 24.501 Ver. 17.5.0, a rejection cause indication for each of the rejected slices may indicate that the S-NSSAI is not available in the current RA. As described herein, the Registration Accept Message may also include SSSA information.

When the WTRU 102 moves to a second TA of the RA, the WTRU 102 may use the SSSA information to determine that one or more of the rejected slices is available in the second TA. For example, the SSSA information may indicate that the slice is available in the second TA. Based on the determination that one or more rejected slices is available in the second TA, the WTRU 102 may register with one or more of the rejected slices by sending a Registration Request to the network and including one or more of the rejected slices in the Requested NSSAI of the Registration Request.

For example, the WTRU 102 may be provided with a timer (e.g., time period or interval) associated with the SSSA in the Registration Accept. When the WTRU 102 moves to a second TA of the RA where the slice is available, WTRU 102 may delay requesting the slice based on the timer (e.g., until after the time period or interval has lapsed) while in the second TA.

Detecting Slice Availability—Example 2

In certain representative embodiments, a WTRU 102 may move to a second TA of the Registration Area. The WTRU 102 may receive Network Slice Group information in a broadcast message, or RRC messaging, and use the Network Slice Group information to determine that one or more of the rejected slices is available in the second TA. For example, the WTRU 102 may detect that one or more of the rejected slices is available in the current TA by detecting a Network Slice Group Identifier that is associated with one or more of the rejected slices in a message, such as an RRC Message or a Broadcast Message.

Detecting that one or more of the rejected slices is available in the second TA may trigger the WTRU 102 to attempt to (e.g., again) register with one or more of the rejected slices by sending a Registration Request to the network and including one or more of the rejected slices in the Requested NSSAI of the Registration Request.

For example, where the WTRU 102 uses Network Slice Group information to determine if a slice is accessible from a TA, the WTRU 102 receives Network Slice Group Information so that the WTRU 102 knows what slices (e.g., S-NSSAIs) are associated with each Network Slice Group. The WTRU 102 may (e.g., still) indicate to the network, in a Registration Request, that the WTRU 102 supports a SSSA. The reason that a support indication may be included is that the support indication would make the AMF 182 aware that, although the AMF 182 rejects a WTRU's attempt to register to a slice in one TA of a RA, the WTRU 102 is able to determine when a re-registration attempt is possible in the same RA. On the other hand, if the WTRU 102 does not indicate to the AMF 182 that the WTRU 102 supports the feature, the AMF 182 would know that it may not reject a slice that may be available in other TAs of the RA because the WTRU 102 may be unable to detect when the slice becomes available.

Detecting Slice Availability—Example 3

In certain representative embodiments, an AMF 182 may receive a WTRU location report from a RAN node (e.g., gNB 180). The WTRU location report may indicate that the WTRU 102 is in a second cell and/or in a second TA. Based on the WTRU location report, the AMF 182 may determine that one or more slices that were previously sent to the WTRU 102 as rejected S-NSSAI(s) are available in the WTRU's current TA. The AMF 182 may determine to send the WTRU 102 information (e.g., a notification) that indicates to the WTRU 102 that the previously rejected slice is now available.

For example, a notification from the AMF 182 to the WTRU 102 may be a DL NAS Transport message that indicate that the previously rejected slice is available in the TA. When the WTRU 102 receives this notification, the WTRU 102 may be triggered to send a new Registration Request to the network that includes the previously rejected S-NSSAI in the Requested NSSAI. As another example, the notification from the AMF 182 to the WTRU 102 may be a UE Configuration Update (UCU) Command message to the WTRU 102 with Allowed NSSAI information that includes the previously rejected S-NSSAI.

Detecting Slice Unavailability—Example 1

In certain representative embodiments, a WTRU 102 may move to a second TA of the RA. The WTRU 102 may use the SSSA information to determine that one or more slices that were in the Allowed NSSAI in the Registration Accept message are not available in the second TA. For example, the SSSA information may indicate that a slice is not available in the second TA. Detecting that one or more of the previously allowed slices is not available in the second TA may trigger the WTRU 102 to attempt to de-register with one or more of the previously allowed slices by sending a Registration Request to the network and not including one or more of the previously allowed slices in the Requested NSSAI of the Registration Request. For example, the WTRU 102 may also send a PDU Session Release message to the network for each PDU Session that is associated with the slices that it is de-registering from.

Detecting Slice Unavailability—Example 2

In certain representative embodiments, an AMF 182 may receive a WTRU location report from a RAN node. The WTRU 102 location report may indicate that the WTRU 102 is in a second cell and/or in a second TA. Based on the WTRU 102 location report, the AMF 182 may determine that one or more slices that the WTRU 102 is currently registered to should not be accessible to the WTRU 102 in the WTRU's current TA. Thus, the AMF 182 may determine that the WTRU 102 should no longer be registered to one or more slices. For example, this determination may trigger the AMF 182 to send an update message, such as a UE Configuration Update (UCU) Command message, to the WTRU 102 with an Allowed NSSAI information element that does not include information indicating the one or more slices. The update message (e.g., the UE Configuration Update Command) may further indicate to the WTRU 102 that the slice that was removed from the Allowed NSSAI is not accessible in the WTRU's current TA.

As another example, the AMF 182 may send the WTRU 102 an Allowed NSSAI that (e.g., still) includes the slice(s) that are not available in the WTRU's current TA and may also send the WTRU 102 an additional (e.g., new) information element. The information element may be referred to as an Accessible NSSAI. The Accessible NSSAI information element may include and/or be the set of slices that are accessible to the WTRU 102 in the WTRU's current location (e.g., TA). In some embodiments, the Accessible NSSAI may only include the slices from the Allowed NSSAI that are accessible to the WTRU 102 in the WTRU's current TA. When the WTRU 102 detects that a slice has become accessible to the WTRU 102 because of a change in the WTRU's location, the AMF 182 may send a (e.g., new) Accessible NSSAI to the WTRU 102 and the Accessible NSSAI may include information indicating the slice that has become available. Detecting that a slice is not available for a WTRU 102 may (e.g., also) trigger the AMF 182 to notify any SMFs 183 that serve the PDU Session(s) that are associated with the network slices that the WTRU 102 will be deregistered from. The notification may (e.g., will) indicate to a corresponding SMF 183 that the WTRU 102 is deregistering from the slice, thus triggering the associated PDU Session to be released.

In some representative embodiments, a slice (e.g., S-NSSAI) subject to SSSA restrictions may be subject to Network Slice Specific Authentication and Authorization (NSSAA). The WTRU 102 may be involved in an ongoing NSSAA procedure (e.g., the S-NSSAI is part of the pending NSSAI in the WTRU 102 and/or AMF 182) while WTRU 102 is transitioning out of the SSSA. When the AMF 182 determines that the WTRU 102 has moved out of the SSSA for the S-NSSAI (e.g., based on a WTRU location report from the RAN), the AMF 182 may abort the NSSAA procedure. For example, the AMF 182 may send a UCU command as described above and include the S-NSSAI as part of the Rejected S-NSSAIs.

Detecting Slice Unavailability—Example 3

In certain representative embodiments, when the WTRU 102 moves to a second TA of the RA, the WTRU 102 may receive Network Slice Group information, such as in a broadcast message and/or RRC messaging, and use the Network Slice Group information to determine that one or more of the slices that are in the WTRU's Allowed NSSAI are not available in the second TA. For example, the WTRU 102 may detect that one or more of the allowed slices is not available in the current TA by detecting that a Network Slice Group Identifier that is associated with one or more of the rejected slices is not included in the message (e.g., RRC Message and/or Broadcast Message).

Slice Unavailability Triggering Deregistration

In certain representative embodiments, detecting that one or more of the allowed slices is not available in the second TA may trigger the WTRU 102 to deregister with one or more of the allowed slices. For example, the WTRU 102 may deregister by sending a Registration Request to the network which does not include one or more of the previously allowed slices in the Requested NSSAI of the Registration Request.

In certain representative embodiments, slice availability may cause changes in how one or more PDU sessions are handled (e.g., by the WTRU 102 and/or the network).

As described herein, when a WTRU 102 is registered to a slice and the WTRU 102 moves to a TA in the WTRU's RA where the slice is not available, the WTRU 102 may be de-registered from the slice. Multiple examples of WTRU 102 and network (e.g., AMF) slice deregistration are described above.

In some representative embodiments, the WTRU 102 may not be triggered to de-register from the slice (e.g., based on slice unavailability). For example, the WTRU 102 may remain registered to the slice, but the WTRU 102 may be prevented and/or prohibited from accessing any of the services of the slice while the WTRU 102 is in the TA where the slice is not accessible.

In some representative embodiments, a WTRU 102 may detect that the WTRU 102 is in a TA where a slice in the WTRU's Allowed NSSAI is not available, such as but not limited to using the techniques described herein. The WTRU 102 may detect that it is in a TA where a slice in the WTRU's Allowed NSSAI is not available, and the WTRU 102 may take steps to prevent the WTRU 102 or any WTRU-hosted applications from accessing the services of the slice (e.g., place communication "on pause" for that slice). The WTRU 102 may check whether or not the S-NSSAI for a PDU Session is subject to SSSA restrictions and/or the S-NSSAI availability in the current TA before deciding to transmit SM signaling, messaging or data for the PDU Session. For example, the WTRU 102 may refrain from activating (e.g., requesting to activate) a UP connection of a PDU Session of the slice. For example, the WTRU 102 may refrain from establishing and/or modifying a PDU Session for the slice. For example, the WTRU 102 may refrain from releasing any PDU Session of the slice. For example, the WTRU 102 may refrain from generating any NAS-SM signaling and/or Mobile Originated (MO) data that is associated with the slice (e.g., refrain from sending any NAS-SM messages to an SMF of the slice).

In certain representative embodiments, a WTRU 102 establishes a PDU session with a slice, the SMF 183 may subscribe to the AMF 182 to receive a notification when the WTRU 102 enters a TA where the slice is not accessible. For example, when the SMF 183 receives a notification that the WTRU 102 is in a location where the slice is not accessible (e.g., outside the SSSA), the SMF 183 may deactivate the UP connection for the PDU Session while maintaining the PDU Session, disable data notifications and/or release the PDU Session if the SMF is not informed that the WTRU 102 moves back into a TA where the WTRU 102 can obtain the service after a period of time. As another example, when the WTRU 102 detects that it enters a TA where the slice is not accessible, the WTRU 102 may send a NAS-SM message informing the SMF 183 (e.g., that the PDU Session activity should be paused). After sending the notification to the SMF 183, the WTRU 102 may not send any additional NAS-SM signaling and/or MO Data for the PDU Session, such as until the WTRU 102 moves to a location where the slice is available.

In certain representative embodiments, when a SMF 183 receives a notification that the WTRU 102 is back in a location where the slice is accessible (e.g., inside the SSSA), the SMF 183 may re-enable data notifications and/or trigger a network-triggered Service Request procedure for a PDU Session to activate the UP connection when the SMF 183 receives downlink data or a data notification from a UPF 184. Based on UP connection reactivation, the WTRU 102 may re-enable communication for that slice that was paused based on the slice being subject to SSSA restriction detected availability. As another example, when the WTRU 102 detects that it enters a TA where the slice becomes accessible, the WTRU 102 may send a NAS-SM message informing the SMF 183 that the PDU session activity should be resumed. After sending the notification to the SMF 183, the WTRU 102 may be allowed to send any NAS-SM signaling or MO data for the PDU session.

Slice Availability Reporting

In certain representative embodiments, the PMF protocol may be enhanced so that a WTRU 102 may send slice availability and/or unavailability reports to the network. A slice availability (or unavailability) report may be a message that is sent by the WTRU 102 to indicate to a function in the network that a slice (e.g., S-NSSAI) is (or is not) available to the WTRU 102. For example, the WTRU 102 may be triggered to send an availability (or unavailability) report when the WTRU 102 detects that the WTRU 102 has moved to a TA where a network slice has become available (or unavailable). The report may indicate to the network that which slice(s) has become available and/or unavailable.

For example, when the network receives a notification that a slice is not available to the WTRU 102 in the WTRU's current location, the network may refrain from sending the WTRU 102 any mobile terminated (MT) data or MT signaling for the slice. For example, when the network receives a notification that a slice is available to the WTRU 102 in the WTRU's current location, the network may resume sending the WTRU 102 any MT data or MT signaling for the slice.

Cell Reselection Considerations

As described herein, a WTRU 102 may receive information (e.g., SSSA information) that may be used by the WTRU 102 to determine the availability of network slices in a TA. In certain representative embodiments, information about slice availability in a TA and/or desired network slices (e.g., the slices that the WTRU 102 desires to include in a Requested NSSAI) may be provided to the Access Stratum by the Non-Access Stratum. The information about slice availability in a TA and/or desired network slices may be used by the Access Stratum in cell reselection. For example, the WTRU 102 may provide the Access Stratum with the Allowed NSSAI and a list of slices (e.g., S-NSSAIs) that the WTRU 102 recently attempted to register to but were rejected (e.g., Rejected S-NSSAIs). The Access Stratum may infer that the Allowed NSSAI and the list of recently rejected S-NSSAIs are a set of slices that the WTRU 102 would like to register to. When the Access Stratum performs cell reselection, the AS may consider the set of slices that the WTRU 102 would like to register to and how many slices from the set are available in the cell. The Access Stratum may use the slice availability information that was provided by the NAS to determine the slice availability in the cell.

As an example, when the NAS provides the set of slices that the WTRU 102 would like to register to, the NAS may also provide the AS with priority information that indicates which slices are most important for the WTRU 102 to access (e.g., at the current time). This information may also be used by the Access Stratum during cell reselection. For example, if no cells are available that can be used to access the entire set of desired slices, the Access Stratum may select a cell where the highest priority slice is available.

Detecting Slice Unavailability and Slice Availability—Example Procedure 1

Figure 2:
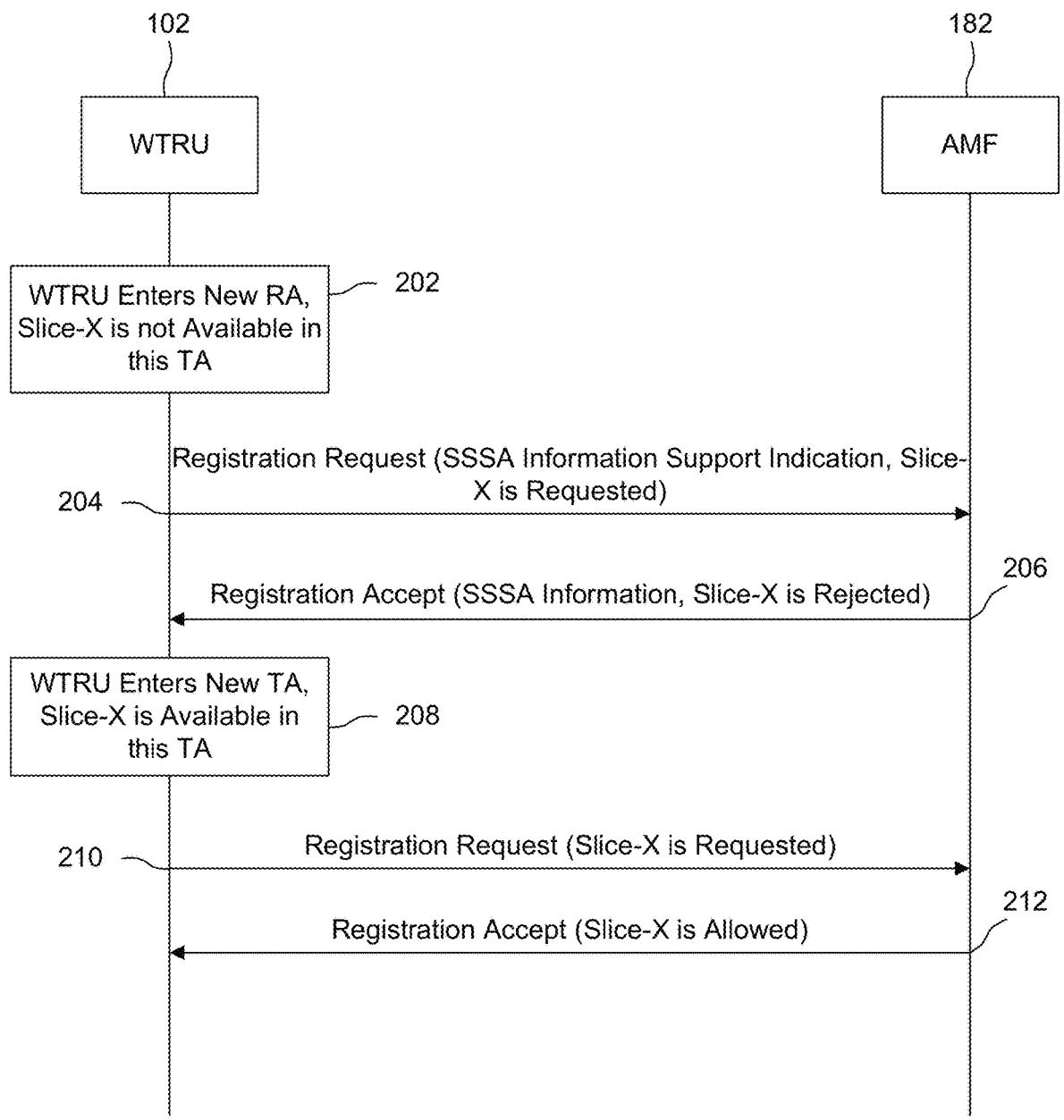
FIG. 2 is a flow diagram that illustrates an example scenario where a WTRU attempts to register with a slice that is not available in the tracking area.

FIG. 2 is a flow diagram that illustrates an example scenario where a WTRU attempts to register with a slice that is not available in the tracking area. As shown in FIG. 2, a WTRU 102 may move into a (e.g., first) TA of a (e.g., new) RA at and attempts to register with a slice that is not available in the TA. In this example, the slice name is Slice-X. In the example, the AMF may (e.g., will) initially not allow the WTRU 102 to register to Slice-X. Later in the example, the WTRU 102 moves to another (e.g., second) TA in the RA and Slice-X is allowed in this TA. In this example, the WTRU 102 may (e.g., will) detect that it is now in a TA where Slice-X is allowed and attempts again to register with Slice-X. The AMF may (e.g., will) respond to this second attempt by allowing the WTRU's registration to Slice-X.

At 202 in FIG. 2, the WTRU 102 may enter a TA that is not part of the WTRU's current RA. By way of example, the WTRU 102 may have multiple slices in its Allowed NSSAI and one of the slices may be Slice-X. For purposes of explanation, it is assumed there are 5 slices in the Allowed NSSAI and that Slice-X is not accessible in the TA.

At 204 in FIG. 2, the WTRU 102 may be triggered (e.g., due to leaving the previous RA and/or entering the current RA) to send a Registration Request. The WTRU 102 may provide a requested NSSAI which includes the 5 slices that are currently in the WTRU's Allowed NSSAI. Thus, the Requested NSSAI includes slice-X. As described herein, the Registration Request may include a SSSA information support indication. For example, the WTRU 102 may have sent the SSSA information support indication in an earlier Registration Request, in which case the AMF 182 may have stored the WTRU's SSSA information support indication in the WTRU's context.

At 206 in FIG. 2, the network may send a Registration Accept Message to the WTRU 102. By way of example, the Allowed NSSAI in the Registration Accept Message may only include 4 slices. The 4 slices may be the 5 slices that the WTRU 102 requested in the previous step minus slice-X. Slice-X is excluded from the Allowed NSSAI because it is not accessible in the TA. As described above, since the AMF 182 received the SSSA information support indication from the WTRU 102, the AMF will indicate that Slice-X is a rejected S-NSSAI and send SSSA information to the WTRU 102. For example, the AMF 182 may indicate to the WTRU 102 that the Slice-X is available in the RA but only rejected in the TA. If the AMF 182 does not receive the SSSA information support indication from the WTRU 102, the AMF 182 may determine to not indicate that Slice-X is a rejected S-NSSAI, not indicate to the WTRU 102 that the slice is only rejected in the TA, and may exclude Slice-X from the Allowed NSSAI. By not indicating that slice-X is allowed or rejected, the WTRU 102 would not be prevented from attempting to register with Slice-X again in the RA. Thus, the SSSA information support indication may be useful to indicate to the network that the WTRU 102 understands a rejection cause code that indicates that the slice is available in the RA but only rejected in the TA.

In certain representative embodiments, where the WTRU 102 provided the SSSA information support indication at 204, the AMF 182 may determine that the WTRU 102 can understand a (e.g., new) slice rejection cause code that indicates to the WTRU 102 that a slice is rejected only for the current TA and not for the entire RA. Thus, when the AMF 182 rejects a slice it may provide this slice rejection cause code to the WTRU 102.

For example, the SSSA information that that the AMF sends to the WTRU 102 may include service area information for slices of the WTRU's Configured NSSAI. As another example, the SSSA information may include service area information for slices of the WTRU's Allowed NSSAI, the rejected S-NSSAI(s) and/or pending S-NSSAI(s).

In certain representative embodiments, when the AMF 182 determines that a slice can be accessed by a WTRU 102 only in a subset of the TAs in the RA, the AMF may determine to not include the slice in the WTRU's Allowed NSSAI. Instead, the AMF may send the WTRU 102 a (e.g., new) information element. The information element may be referred to as a Service-Area-Limited NSSAI. The Service-Area-Limited NSSAI information element may include or be a list of slices (e.g., S-NSSAI's) that the WTRU 102 can access in the RA, but not in all TAs of the RA. The Service-Area-Limited NSSAI may be associated with, or a part of, the SSSA information which indicates, to the WTRU 102, where in the RA the slices of the Service-Area-Limited NSSAI are available. One advantage to this approach may be that a WTRU 102 that does not support the Service-Area-Limited NSSAI information element will ignore the new IE. Since the slices that are in the Service-Area-Limited NSSAI will not be rejected or allowed, such a non-supporting WTRU 102 would be able to try registration again in the RA. A WTRU 102 that does support the Service-Area-Limited NSSAI information element will be able to understand that there is a list of slices whose availability are limited and understand the limitations that are listed in the SSSA information element.

For example, the network slice (S-NSSAI) may be included in both the Allowed NSSAI and Service-Area-Limited NSSAI. For example, if the WTRU 102 performs registration in a TA where Slice-X is available, Slice-X may be included in the Allowed NSSAI and/or the Service-Area-Limited NSSAI. When the WTRU 102 moves to another TA where Slice-X is not available, the network may detect that the WTRU 102 is now in a location where Slice-x is not available and may send a UE Configuration Update command to the WTRU 102 and provide the WTRU 102 with a new Allowed NSSAI which does not include Slice-X or the WTRU 102 may send a new Registration Request. The new Registration Request may exclude Slice-X from the Requested NSSAI and the network may exclude slice-X from the Allowed NSSAI.

In an example, if the WTRU 102 performs registration in a TA where Slice-X is not available, Slice-X may be included in the Service-Area-Limited NSSAI but not the Allowed NSSAI and Slice-X will not be rejected. The WTRU 102 may use the SSSA information that is associated with the Service-Area-Limited NSSAI to detect when Slice-X becomes available so that the WTRU 102 can attempt again to register with Slice-X.

In certain representative embodiments, where the AMF 182 sends a Registration Reject message to the WTRU 102, the Registration Reject message may include SSSA information for rejected S-NSSAI(s). The Registration Reject message may cause the WTRU 102 to move to the RM-DEREGISTERED state and store the SSSA information. The SSSA information may then be used by the WTRU 102 to determine to attempt a new Registration Request, such as when the WTRU 102 moves to a TA where one or more of the rejected slices are available.

At 208 in FIG. 2, the WTRU 102 moves to a second (e.g., new) TA (e.g., in the WTRU's RA). The SSSA information that was received previously indicates that Slice-X is available in the second TA. The WTRU 102 uses the SSSA information to determine that Slice-X is available.

At 210 in FIG. 2, the availability of Slice-X may trigger the WTRU 102 to send a Registration Request to the network where Slice-X registration is requested. The Requested NSSAI of the Registration Request may include the 4 slices from the Allowed NSSAI and Slice-X.

At 212 in FIG. 2, the AMF 182 may send a Registration Accept message to the WTRU 102 which includes information indicating the 5 slices from the Requested NSSAI that was provided previously at 210 Thus, the WTRU 102 is now registered to Slice-x.

Detecting Slice Unavailability and Slice Availability—Example Procedure 2

Figure 3:
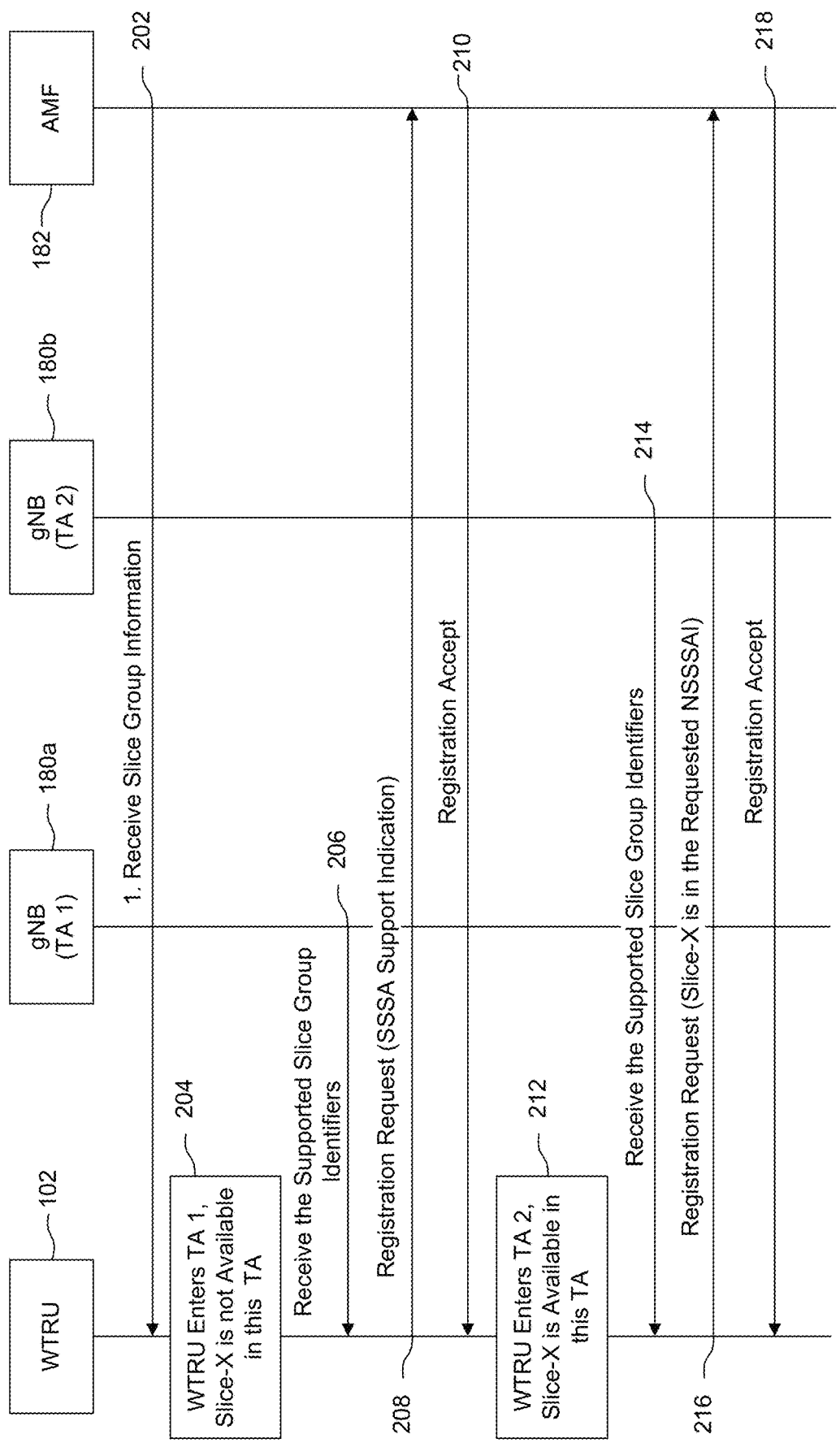
FIG. 3 is a flow diagram that illustrates an example scenario where a WTRU may use messaging from a RAN to determine slice support.

FIG. 3 is a flow diagram that illustrates an example scenario where a WTRU may use messaging from a RAN to determine slice support. In FIG. 3 a WTRU 102 may use messaging (e.g., broadcast and/or RRC messaging) from a RAN (e.g., base station) to determine if a slice is supported in a TA. In this example, the WTRU 102 may detect whether or not the slice is supported prior to attempting to register. As in FIG. 2, the registration target slice is named Slice-X.

For example, there may be a pre-condition that the WTRU 102 has 5 slices in its Allowed NSSAI and one of the slices in the Allowed NSSAI is Slice-X.

At 202 in FIG. 3, the WTRU 102 may receive (e.g., from AMF 182) information that indicates which slices (e.g., S-NSSAIs) are associated with each slice group identifier. For example, this information may be received in a NAS-MM message, such as a Registration Accept or a WTRU Configuration Update Command.

At 204 in FIG. 3, the WTRU 102 may enter a TA that is not part of the WTRU's current RA. For example, the WTRU 102 may have 5 slices in its Allowed NSSAI and one of the slices may be Slice-X.

At 206 in FIG. 3, the WTRU 102 may receive a broadcast and/or RRC message from a base station (e.g., gNB 180a associated with TA1). The broadcast and/or RRC message may include slice group identifiers. The WTRU 102 may use the slice group identifiers and the slice group information from 202 to determine that Slice-X is not supported in the TA (e.g., TA1).

At 208 in FIG. 3, the WTRU 102 may be triggered to send a Registration Request. As Slice-X is not supported in the TA, the Requested NSSAI may include the 4 slices that are currently in the WTRU's Allowed NSSAI minus Slice-X. That is, the Requested NSSAI does not include Slice-X. As described herein, the Registration Request may include a SSSA information support indication.

At 210 in FIG. 3, the network sends a Registration Accept Message to the WTRU 102. By way of example, the Allowed NSSAI in the Registration Accept Message may only include 4 slices. The 4 slices may be the 4 slices from the Requested NSSAI.

At 212 in FIG. 3, the WTRU 102 may move to a second (e.g., new) TA (e.g., TA2). The second TA may be in the WTRU's RA. The Slice-X is available in the second TA.

At 214 in FIG. 3, the WTRU 102 may receive a broadcast and/or RRC message from a base station (e.g., gNB 180b associated with TA2). The broadcast or RRC message may include information indicating slice group identifiers. The WTRU 102 may use the slice group identifiers and the slice group information from 202 to determine that Slice-X is supported in the TA. At 214, the broadcast and/or RRC message may include a slice group identifier that is associated with Slice-X.

At 216 in FIG. 3, the availability of Slice-X (e.g., in the second TA) may trigger the WTRU 102 to send a Registration Request to the network. The Requested NSSAI of the Registration Request may include information indicating the 4 slices from the Allowed NSSAI (e.g., at 210) and Slice-X.

At 218 in FIG. 3, the AMF 182 sends a Registration Accept message to the WTRU 102 which may include all 5 slices from the Requested NSSAI that was provided previously at 210. Thus, the WTRU 102 is now registered to Slice-X.

FIG. 4 is a procedural diagram illustrating an example procedure for slice registration. In certain representative embodiments, the procedure in FIG. 4 may be implemented (e.g., as a method) generally by a WTRU 102. In FIG. 4, a WTRU 102 may send a first registration request which includes information indicating SSSA support and a first requested network slice selection assistance information NSSAI at 402. At 404, the WTRU 102 may receive a first registration accept which includes information indicating that one or more S-NSSAIs of the first requested NSSAI are rejected and information indicating one or more first tracking areas TAs which support the one or more rejected S-NSSAIs. For example, the first registration request may be sent to, and the first registration accept may be received from, (e.g., as part of a registration procedure) a network entity, such as an AMF 182 as described herein. At 406, on condition the WTRU 102 has entered a TA of the one or more first TAs which support at least one of the rejected S-NSSAIs, the WTRU 102 may send a second registration request which includes information indicating a second requested NSSAI. For example, the second requested NSSAI may be associated with the at least one of the rejected S-NSSAIs.

In certain representative embodiments, the WTRU 102 may receive a second registration accept (e.g., associated with the second registration request) which includes information indicating that at least one of the rejected S-NSSAIs associated with the second requested NSSAI is allowed. For example, the second registration request may be sent to, and the second registration accept may be received from, (e.g., as part of a registration procedure) a network entity, such as an AMF 182 as described herein.

In certain representative embodiments, the WTRU 102 may receive a second registration accept (e.g., associated with the second registration request) which includes information indicating that at least one of the rejected S-NSSAIs is allowed.

In certain representative embodiments, the WTRU 102 may receive information indicating a registration area which includes a plurality of TAs. For example, the plurality of TAs may include the one or more first TAs. For example, the registration area may be provided to the WTRU 102 in a registration accept, such as at 404.

In certain representative embodiments, the first registration request may be sent to a base station (e.g., gNB 180)

associated with a second TA, of the plurality of TAs, other than the one or more first TAs. For example, the first registration request may be sent by the WTRU 102 in one TA which supports certain slices, and the second registration request may be sent by the WTRU 102 in another TA which supports certain other slices as described herein.

In certain representative embodiments, the second registration request may be sent to a base station (e.g., gNB 180) associated with the TA (e.g., the TA at 406) of the one or more first TAs.

In certain representative embodiments, the first registration accept may be received from a base station (e.g., gNB 180) associated with a second TA, of the plurality of TAs, other than one or more first TAs.

In certain representative embodiments, the second registration accept may be received from a base station (e.g., gNB 180) associated with the TA (e.g., the TA at 406) of the one or more first TAs.

In certain representative embodiments, the WTRU 102 may determine that the WTRU 102 has entered the TA (e.g., the TA at 406) of the one or more first TAs prior to sending the second registration request.

In certain representative embodiments, the WTRU 102 may determine that the WTRU 102 is communicating with a base station (e.g., gNB 180) that is not part of a TA in which the first registration accept (e.g., at 406) is received.

In certain representative embodiments, the information indicating the one or more first TAs which support the one or more rejected S-NSSAIs may include an association between the one or more first TAs and ones of the rejected S-NSSAIs which are supported. For example, each first TA may be associated with (e.g., support for) at least one rejected S-NSSAI.

FIG. 5 is a procedural diagram illustrating an example procedure for slice registration. In certain representative embodiments, the procedure in FIG. 5 may be implemented (e.g., as a method) generally by a WTRU 102. In FIG. 5, a WTRU 102 may send a first registration request which includes information indicating SSSA support and a first requested network slice selection assistance information NSSAI at 502. At 504, the WTRU 102 may receive a first registration accept which includes information indicating one or more service area limited S-NSSAIs of the first requested NSSAI and information indicating one or more first TAs which support the one or more service area limited S-NSSAIs. For example, the first registration request may be sent to, and the first registration accept may be received from, (e.g., as part of a registration procedure) a network entity, such as an AMF 182 as described herein. At 506, on condition the WTRU 102 has entered a TA of the one or more first TAs which support at least one of the one or more service area limited S-NSSAIs, the WTRU 102 may send a second registration request which includes information indicating a second requested NSSAI. For example, the second requested NSSAI may be associated with the at least one of the one or more service area limited S-NSSAIs.

In certain representative embodiments, the WTRU 102 may receive a second registration accept which includes information indicating that at least one of the service area limited S-NSSAIs associated with the second requested NSSAI is allowed. For example, the second registration request may be sent to, and the second registration accept may be received from, (e.g., as part of a registration procedure) a network entity, such as an AMF 182 as described herein.

In certain representative embodiments, the WTRU 102 may receive a second registration accept which includes information indicating that at least one of the one or more service area limited S-NSSAIs is allowed.

In certain representative embodiments, the WTRU 102 may receive information indicating a registration area which includes a plurality of TAs. For example, the plurality of TAs may include the one or more first TAs.

In certain representative embodiments, the first registration request may be sent to a base station (e.g., gNB 180) associated with a second TA (e.g., which does not support the one or more service area limited S-NSSAIs), of the plurality of TAs, other than the one or more first TAs.

In certain representative embodiments, the second registration request may be sent to a base station (e.g., gNB 180) associated with the TA of the one or more first TAs.

In certain representative embodiments, the first registration accept may be received from a base station (e.g., gNB 180) associated with a second TA (e.g., which does not support the one or more service area limited S-NSSAIs), of the plurality of TAs, other than one or more TAs.

In certain representative embodiments, the second registration request may be sent to a base station (e.g., gNB 180) associated with the TA of the one or more first TAs.

In certain representative embodiments, the first registration accept may be received from a base station (e.g., gNB 180) associated with a second TA (e.g., which does not support the one or more service area limited S-NSSAIs), of the plurality of TAs, other than one or more TAs.

In certain representative embodiments, the second registration accept may be received from a base station (e.g., gNB 180) associated with the TA of the one or more TAs.

In certain representative embodiments, the WTRU 102 may determine that the WTRU 102 has entered the TA (e.g., at 506) of the one or more first TAs prior to sending the second registration request.

In certain representative embodiments, the WTRU 102 may determine that the WTRU 102 is communicating with a base station (e.g., gNB 180) that is not part of a TA in which the first registration accept (e.g., at 504) is received.

In certain representative embodiments, the information indicating the one or more service area limited single-NSSAIs of the first requested NSSAI may be included in a service area limited information element (e.g., of the first registration accept).

In certain representative embodiments, the first registration accept may include information indicating an allowed NSSAI or at least one allowed S-NSSAI.

In certain representative embodiments, the first registration accept may include information indicating a rejected NSSAI or at least one rejected S-NSSAI.

Figures 6, 7:
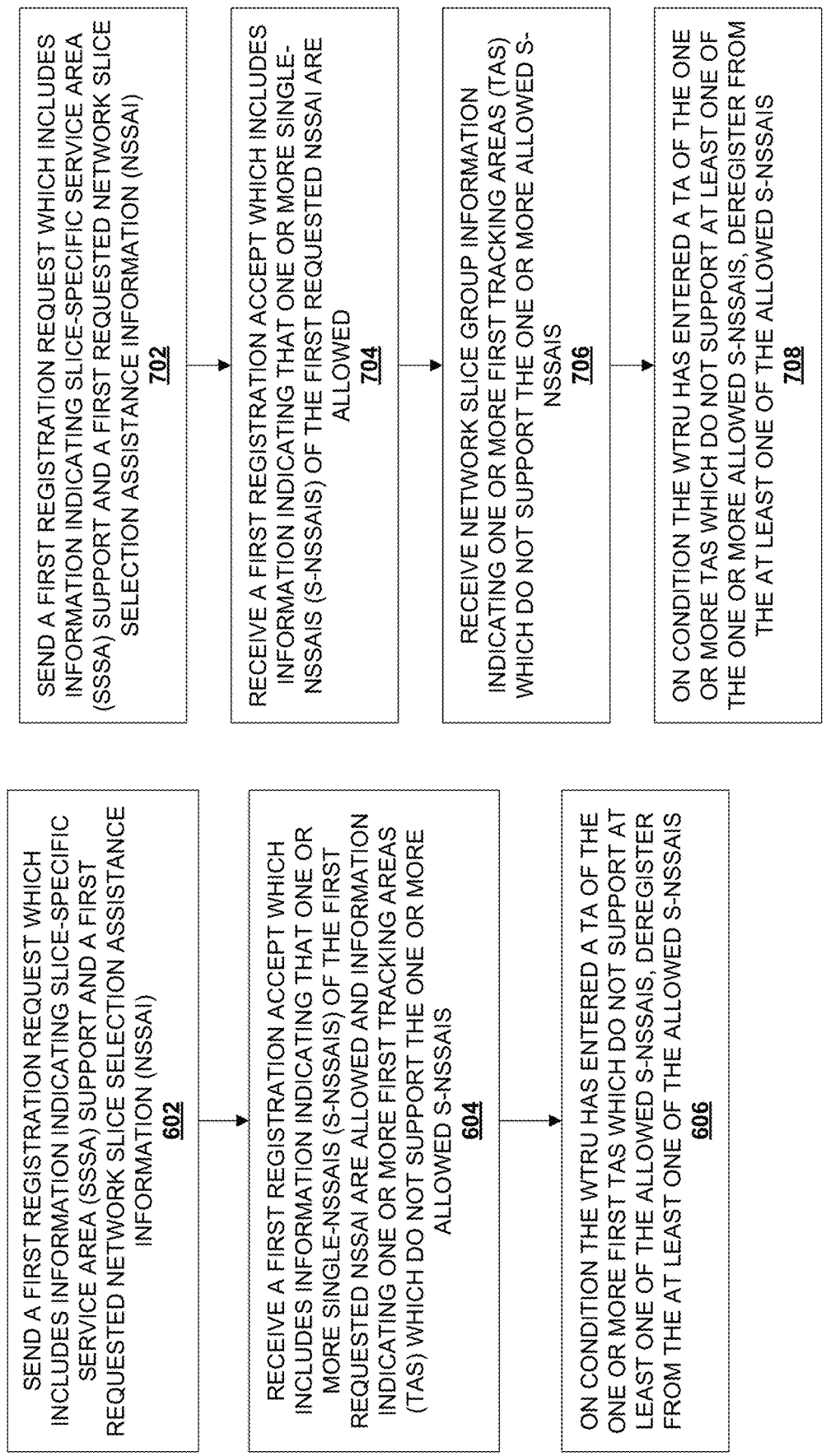
FIG. 6 is a procedural diagram illustrating an example procedure for slice deregistration.
FIG. 7 is a procedural diagram illustrating another example procedure for slice deregistration.

FIG. 6 is a procedural diagram illustrating an example procedure for slice deregistration. In certain representative embodiments, the procedure in FIG. 6 may be implemented (e.g., as a method) generally by a WTRU 102. In FIG. 6, a WTRU 102 may send a first registration request which includes information indicating SSSA support and a first requested NSSAI at 602. At 604, the WTRU 102 may receive a first registration accept which includes information indicating that one or more S-NSSAIs of the first requested NSSAI are allowed and information indicating one or more first TAs which do not support the one or more allowed S-NSSAIs. For example, the first registration request may be sent to, and the first registration accept may be received from, (e.g., as part of a registration procedure) a network entity, such as an AMF 182 as described herein. At 606, on condition the WTRU 102 has entered a TA of the one or more first TAs which do not support at least one of the allowed S-NSSAIs, the WTRU 102 may deregister from the at least one of the allowed S-NSSAIs.

In certain representative embodiments, the deregistering may include the WTRU 102 sending a second registration request which includes information indicating a second requested NSSAI. For example, the second registration request may include information indicating SSSA support. For example, the second registration request may include the second requested NSSAI which is associated with one or more S-NSSAIs which are supported in the first TA. For example, the second registration request may be sent to, and the second registration accept may be received from, (e.g., as part of a registration procedure) a network entity, such as an AMF 182 as described herein.

In certain representative embodiments, the deregistering may include the WTRU 102 receiving a second registration accept which includes information indicating that one or more S-NSSAIs of the second requested NSSAI are allowed.

In certain representative embodiments, the WTRU 102 may receive information indicating a registration area which includes a plurality of TAs. For example, the plurality of TAs may include the one or more first TAs.

In certain representative embodiments, the first registration request may be sent to a base station (e.g., gNB 180) associated with a second TA, of the plurality of TAs, other than the one or more first TAs.

In certain representative embodiments, the second registration request may be sent to a base station (e.g., gNB 180) associated with the TA of the one or more first TAs.

In certain representative embodiments, the first registration accept may be received from a base station (e.g., gNB 180) associated with a second TA, of the plurality of TAs, other than the one or more first TAs.

In certain representative embodiments, the WTRU 102 may determine that the WTRU 102 has entered the TA of the one or more first TAs (e.g., at 606) prior to deregistering from the at least one of the allowed S-NSSAIs.

In certain representative embodiments, the WTRU 102 may determine that the WTRU 102 is communicating with a base station (e.g., gNB 180) that is not part of a TA in which the first registration accept is received (e.g., at 604) prior to deregistering from the at least one of the allowed S-NSSAIs.

In certain representative embodiments, the information indicating the one or more TAs which do not support the one or more allowed S-NSSAIs includes an association between the one or more TAs and ones of the S-NSSAIs of the first requested NSSAI. For example, each first TA may be associated with (e.g., not providing support for) at least one allowed S-NSSAI.

FIG. 7 is a procedural diagram illustrating an example procedure for slice deregistration. In certain representative embodiments, the procedure in FIG. 7 may be implemented (e.g., as a method) generally by a WTRU 102. In FIG. 7, a WTRU 102 may send a first registration request which includes information indicating SSSA support and a first requested NSSAI at 702. At 704, the WTRU 102 may receive a first registration accept which includes information indicating that one or more S-NSSAIs of the first requested NSSAI are allowed. For example, the first registration request may be sent to, and the first registration accept may be received from, (e.g., as part of a registration procedure) a network entity, such as an AMF 182 as described herein. The WTRU 102 may receive network slice group information indicating one or more first TAs which do not support the one or more allowed S-NSSAIs at 706. At 708, on condition the WTRU 102 has entered a TA of the one or more TAs which do not support at least one of the one or more allowed S-NSSAIs, the WTRU 102 may deregister from the at least one of the allowed S-NSSAIs.

In certain representative embodiments, the deregistering may include the WTRU 102 sending a second registration request which includes information indicating a second requested NSSAI. For example, the second registration request may include information indicating SSSA support. For example, the second registration request may include the second requested NSSAI which is associated with one or more S-NSSAIs which are supported in the TA. For example, the second registration request may be sent to, and the second registration accept may be received from, (e.g., as part of a registration procedure) a network entity, such as an AMF 182 as described herein.

In certain representative embodiments, the deregistering may include the WTRU 102 receiving a second registration accept which includes information indicating that one or more S-NSSAIs of the second requested NSSAI are allowed.

In certain representative embodiments, the WTRU 102 may receive information indicating a registration area which includes a plurality of TAs. For example, the plurality of TAs may include the one or more first TAs.

In certain representative embodiments, the first registration request may be sent to a base station (e.g., gNB 180) associated with a second TA (e.g., which supports the allowed S-NSSAIs), of the plurality of TAs, other than the one or more first TAs.

In certain representative embodiments, the second registration request may be sent to a base station (e.g., gNB 180) associated with the TA of the one or more first TAs.

In certain representative embodiments, the first registration accept may be received from a base station (e.g., gNB 180) associated with a second TA (e.g., which supports the allowed S-NSSAIs), of the plurality of TAs, other than the one or more first TAs.

In certain representative embodiments, the WTRU 102 may determine that the WTRU 102 has entered the TA of the one or more first TAs (e.g., at 606) prior to deregistering from the at least one of the allowed S-NSSAIs.

In certain representative embodiments, the WTRU 102 may determine that the WTRU 102 is communicating with a base station (e.g., gNB 180) that is not part of a TA in which the first registration accept is received (e.g., at 604) prior to deregistering from the at least one of the allowed S-NSSAIs.

In certain representative embodiments, the information indicating the one or more TAs which do not support the one or more allowed S-NSSAIs includes an association between the one or more TAs and ones of the S-NSSAIs of the first requested NSSAI. For example, each first TA may be associated with (e.g., not providing support for) at least one allowed S-NSSAI.

FIG. 8 is a procedural diagram illustrating an example procedure for slice registration. In certain representative embodiments, the procedure in FIG. 8 may be implemented (e.g., as a method) generally by a network entity, such as an AMF 182. In FIG. 8, an AMF 182 may receive a first registration request (e.g., from a WTRU 102) which includes information indicating SSSA support and a first requested network slice selection assistance information NSSAI at 802. At 804, the AMF 182 may send a first registration accept (e.g., via a base station) which includes information indicating that one or more S-NSSAIs of the first requested NSSAI are rejected and information indicating one or more first tracking areas TAs which support the one or more rejected S-NSSAIs. At 806, after the WTRU 102 has entered a TA of the one or more first TAs which support at least one of the rejected S-NSSAIs, the AMF 182 may receive (e.g., from the WTRU 102) a second registration request which includes information indicating a second requested NSSAI. For example, the second requested NSSAI may be associated with the at least one of the rejected S-NSSAIs.

In certain representative embodiments, the AMF 182 may send a second registration accept (e.g., associated with the second registration request) which includes information indicating that at least one of the rejected S-NSSAIs associated with the second requested NSSAI is allowed.

In certain representative embodiments, the AMF 182 may send a second registration accept (e.g., associated with the second registration request) which includes information indicating that at least one of the rejected S-NSSAIs is allowed.

In certain representative embodiments, the AMF 182 may send information indicating a registration area which includes a plurality of TAs. For example, the plurality of TAs may include the one or more first TAs.

In certain representative embodiments, the first registration request may be sent by the WTRU 102 to a base station (e.g., gNB 180) associated with a second TA, of the plurality of TAs, other than the one or more first TAs.

In certain representative embodiments, the second registration request may be sent by the WTRU 102 to a base station (e.g., gNB 180) associated with the TA (e.g., the TA at 406) of the one or more first TAs.

In certain representative embodiments, the first registration accept may be sent using (e.g., via) a base station (e.g., gNB 180) associated with a second TA, of the plurality of TAS, other than one or more first TAs.

In certain representative embodiments, the second registration accept may be sent using (e.g., via) a base station (e.g., gNB 180) associated with the TA (e.g., the TA at 406) of the one or more first TAs.

In certain representative embodiments, the WTRU 102 may determine that the WTRU 102 has entered the TA (e.g., the TA at 406) of the one or more first TAs prior to sending the second registration request to the AMF 182.

In certain representative embodiments, the WTRU 102 may determine that the WTRU 102 is communicating with a base station (e.g., gNB 180) that is not part of a TA in which the first registration accept (e.g., at 406) is received prior to sending the second registration request to the AMF 182.

In certain representative embodiments, the information indicating the one or more first TAs which support the one or more rejected S-NSSAIs may include an association between the one or more first TAs and ones of the rejected S-NSSAIs which are supported. For example, each first TA may be associated with (e.g., support for) at least one rejected S-NSSAI.

FIG. 9 is a procedural diagram illustrating an example procedure for slice registration. In certain representative embodiments, the procedure in FIG. 9 may be implemented (e.g., as a method) generally by a network entity, such as an AMF 182. In FIG. 9, an AMF 182 may receive (e.g., from a WTRU 102) a first registration request which includes information indicating SSSA support and a first requested network slice selection assistance information NSSAI at 902. At 904, the AMF 182 may send (e.g., to the WTRU 102) a first registration accept which includes information indicating one or more service area limited S-NSSAIs of the first requested NSSAI and information indicating one or more first TAs which support the one or more service area limited S-NSSAIs. At 906, after the WTRU 102 has entered a TA of the one or more first TAs which support at least one of the one or more service area limited S-NSSAIs, the AMF 182 may receive (e.g., from the WTRU 102) a second registration request which includes information indicating a second requested NSSAI. For example, the second requested NSSAI may be associated with the at least one of the one or more service area limited S-NSSAIs.

In certain representative embodiments, the AMF 182 may send (e.g., to the WTRU 102) a second registration accept which includes information indicating that at least one of the service area limited S-NSSAIs associated with the second requested NSSAI is allowed.

In certain representative embodiments, the AMF 182 may send a second registration accept which includes information indicating that at least one of the one or more service area limited S-NSSAIs is allowed.

In certain representative embodiments, the AMF 182 may send (e.g., in the registration accept) information indicating a registration area which includes a plurality of TAs. For example, the plurality of TAs may include the one or more first TAs.

In certain representative embodiments, the first registration request may be sent to a base station (e.g., gNB 180) associated with a second TA (e.g., which does not support the one or more service area limited S-NSSAIs), of the plurality of TAs, other than the one or more first TAs.

In certain representative embodiments, the second registration request may be sent to a base station (e.g., gNB 180) associated with the TA of the one or more first TAs.

In certain representative embodiments, the first registration accept may be received from a base station (e.g., gNB 180) associated with a second TA (e.g., which does not support the one or more service area limited S-NSSAIs), of the plurality of TAs, other than one or more TAs.

In certain representative embodiments, the second registration request may be sent by the WTRU 102 to a base station (e.g., gNB 180) associated with the TA of the one or more first TAs.

In certain representative embodiments, the first registration accept may be sent using (e.g., via) a base station (e.g., gNB 180) associated with a second TA (e.g., which does not support the one or more service area limited S-NSSAIs), of the plurality of TAs, other than one or more TAs.

In certain representative embodiments, the second registration accept may be sent (e.g., via) using a base station (e.g., gNB 180) associated with the TA of the one or more TAs.

In certain representative embodiments, the WTRU 102 may determine that the WTRU 102 has entered the TA (e.g., at 506) of the one or more first TAs prior to sending the second registration request to the AMF 182.

In certain representative embodiments, the WTRU 102 may determine that the WTRU 102 is communicating with a base station (e.g., gNB 180) that is not part of a TA in which the first registration accept (e.g., at 504) is received.

In certain representative embodiments, the information indicating the one or more service area limited single-NSSAIs of the first requested NSSAI may be included in a service area limited information element (e.g., of the first registration accept).

In certain representative embodiments, the first registration accept may include information indicating an allowed NSSAI or at least one allowed S-NSSAI.

In certain representative embodiments, the first registration accept may include information indicating a rejected NSSAI or at least one rejected S-NSSAI.

FIG. 10 is a procedural diagram illustrating an example procedure for slice deregistration. In certain representative embodiments, the procedure in FIG. 10 may be implemented (e.g., as a method) generally by a network entity, such as an AMF 182. In FIG. 10, a WTRU 102 may send a first registration request, which is received by an AMF 182, which includes information indicating SSSA support and a first requested NSSAI at 1002. At 1004, the AMF 182 may send a first registration accept (e.g., to the WTRU 102) which includes information indicating that one or more S-NSSAIs of the first requested NSSAI are allowed and information indicating one or more first TAs which do not support the one or more allowed S-NSSAIs. At 1006, after the WTRU 102 has entered a TA of the one or more first TAs which do not support at least one of the allowed S-NSSAIs, the AMF 182 may deregister from the at least one of the allowed S-NSSAIs.

In certain representative embodiments, the deregistering may include the AMF 182 receiving (e.g., from the WTRU 102) a second registration request which includes information indicating a second requested NSSAI. For example, the second registration request may include information indicating SSSA support. For example, the second registration request may include the second requested NSSAI which is associated with one or more S-NSSAIs which are supported in the first TA.

In certain representative embodiments, the deregistering may include the AMF 182 sending (e.g., to the WTRU 102) a second registration accept which includes information indicating that one or more S-NSSAIs of the second requested NSSAI are allowed.

In certain representative embodiments, the AMF 182 may send (e.g., in a registration accept) information indicating a registration area which includes a plurality of TAs. For example, the plurality of TAs may include the one or more first TAs.

In certain representative embodiments, the first registration request may be sent by the WTRU 102 to a base station (e.g., gNB 180) associated with a second TA, of the plurality of TAs, other than the one or more first TAs.

In certain representative embodiments, the second registration request may be sent by the WTRU 102 to a base station (e.g., gNB 180) associated with the TA of the one or more first TAs.

In certain representative embodiments, the first registration accept may be sent by the AMF 182 using (e.g., via) a base station (e.g., gNB 180) associated with a second TA, of the plurality of TAs, other than the one or more first TAs.

In certain representative embodiments, the WTRU 102 may determine that the WTRU 102 has entered the TA of the one or more first TAs (e.g., at 606) prior to the AMF 182 deregistering the WTRU 102 from the at least one of the allowed S-NSSAIs.

In certain representative embodiments, the WTRU 102 may determine that the WTRU 102 is communicating with a base station (e.g., gNB 180) that is not part of a TA in which the first registration accept is received (e.g., at 604) prior to the AMF 182 deregistering the WTRU 102 from the at least one of the allowed S-NSSAIs.

In certain representative embodiments, the information indicating the one or more TAs which do not support the one or more allowed S-NSSAIs includes an association between the one or more TAs and ones of the S-NSSAIs of the first requested NSSAI. For example, each first TA may be associated with (e.g., not providing support for) at least one allowed S-NSSAI.

FIG. 11 is a procedural diagram illustrating an example procedure for slice deregistration. In certain representative embodiments, the procedure in FIG. 11 may be implemented (e.g., as a method) generally by a network entity, such as an AMF 182. In FIG. 11, an AMF 182 may receive, from a WTRU 102, a first registration request which includes information indicating SSSA support and a first requested NSSAI at 1102. At 1104, the AMF 182 may send (e.g., to the WTRU 102) a first registration accept which includes information indicating that one or more S-NSSAIs of the first requested NSSAI are allowed. For example, the WTRU 102 may receive network slice group information indicating one or more first TAs which do not support the one or more allowed S-NSSAIs. At 1108, after the WTRU 102 has entered a TA of the one or more TAs which do not support at least one of the one or more allowed S-NSSAIs, the AMF 182 may deregister the WTRU 102 from the at least one of the allowed S-NSSAIs.

In certain representative embodiments, the deregistering may include the AMF 182 receiving, from the WTRU 102, a second registration request which includes information indicating a second requested NSSAI. For example, the second registration request may include information indicating SSSA support. For example, the second registration request may include the second requested NSSAI which is associated with one or more S-NSSAIs which are supported in the TA.

In certain representative embodiments, the deregistering may include the AMF 182 sending, to the WTRU 102, a second registration accept which includes information indicating that one or more S-NSSAIs of the second requested NSSAI are allowed.

In certain representative embodiments, the AMF 182 may send (e.g., in a registration accept) information indicating a registration area which includes a plurality of TAs. For example, the plurality of TAs may include the one or more first TAs.

In certain representative embodiments, the first registration request may be sent by the WTRU 102 to a base station (e.g., gNB 180) associated with a second TA (e.g., which supports the allowed S-NSSAIs), of the plurality of TAs, other than the one or more first TAs.

In certain representative embodiments, the second registration request may be sent by the WTRU 102 to a base station (e.g., gNB 180) associated with the TA of the one or more first TAs.

In certain representative embodiments, the first registration accept may be sent by the AMF 182 using (e.g., via) a base station (e.g., gNB 180) associated with a second TA (e.g., which supports the allowed S-NSSAIs), of the plurality of TAs, other than the one or more first TAs.

In certain representative embodiments, the WTRU 102 may determine that the WTRU 102 has entered the TA of the one or more first TAs (e.g., at 606) prior to the AMF 182 deregistering the WTRU 102 from the at least one of the allowed S-NSSAIs.

In certain representative embodiments, the WTRU 102 may determine that the WTRU 102 is communicating with a base station (e.g., gNB 180) that is not part of a TA in which the first registration accept is received (e.g., at 604) prior to the AMF 182 deregistering the WTRU 102 from the at least one of the allowed S-NSSAIs.

In certain representative embodiments, the information indicating the one or more TAs which do not support the one or more allowed S-NSSAIs includes an association between the one or more TAs and ones of the S-NSSAIs of the first requested NSSAI. For example, each first TA may be associated with (e.g., not providing support for) at least one allowed S-NSSAI.

FIG. 12 is a procedural diagram illustrating an example procedure for slice registration. In certain representative embodiments, the procedure in FIG. 12 may be implemented (e.g., as a method) generally by a WTRU 102. In FIG. 12, a WTRU 102 may send, in a first TA (e.g., which does not support a set of slices available in the network), information indicating a first requested NSSAI (e.g., to a network entity) at 1202. At 1204, the WTRU 102 may receive (e.g., from a network entity) information indicating that one or more S-NSSAIs of the first requested NSSAI are rejected and information indicating one or more second TAs which support the one or more rejected S-NSSAIs. In some examples, the WTRU 102 may receive the information at 1204 as part of a registration procedure at 1202, such as in a registration accept message from a network entity (e.g., an AMF 182). At 1206, the WTRU 102 may, after the WTRU 102 has entered a TA of the one or more second TAs which support at least one of the rejected S-NSSAIs, send, in the TA (e.g., which does support the rejected slices), information indicating a second requested NSSAI (e.g., to a network entity). The second requested NSSAI may be associated with the at least one of the rejected S-NSSAIs.

FIG. 13 is a procedural diagram illustrating an example procedure for slice registration. In certain representative embodiments, the procedure in FIG. 13 may be implemented (e.g., as a method) generally by a WTRU 102. In FIG. 13, a WTRU 102 may send, in a first TA (e.g., which does not support a set of slices available in the network), information indicating a first requested NSSAI (e.g., to a network entity) at 1302. At 1304, the WTRU 102 may receive (e.g., from a network entity) information indicating that one or more S-NSSAIs of the first requested NSSAI are allowed and information indicating one or more second TAs which do not support the one or more allowed S-NSSAIs. In some examples, the WTRU 102 may receive the information at 1304 as part of a registration procedure at 1302, such as in a registration accept message from a network entity (e.g., an AMF 182). At 1306, after the WTRU 102 has entered a TA of the one or more second TAs which do not support at least one of the allowed S-NSSAIs, the WTRU 102 may deregister (e.g., with a network entity) in the TA from the at least one of the allowed S-NSSAIs. For example, the WTRU 102 may send information indicating a second requested NSSAI at 1306. The second requested NSSAI may be associated with S-NSSAIs other than the allowed S-NSSAIs which are not supported by the TA.

In certain representative embodiments, a wireless transmit/receive unit (WTRU) may be configured to perform (e.g., implement a method) acts which include sending (e.g., to a network entity) a first registration request message associated with a first tracking area (TA) of a registration area (RA). For example, the first registration request may include (1) information indicating a set of slices which are requested by the WTRU. The WTRU may receive (e.g., from the network entity) a first registration accept message which may include (1) information indicating that a first slice of the set of slices is rejected and (2) slice-specific service area (SSSA) information indicating at least one second TA of the RA where the first slice is available. On condition that (e.g., after) the WTRU received the SSSA and the WTRU has entered the at least one second TA, the WTRU may send (e.g., to a network entity), a second registration request message associated with the second TA of the RA. For example, the second registration request may include (1) information indicating at least the first slice of the set of slices is requested by the WTRU. The WTRU may further receive (e.g., from the network entity) a second registration accept message which may include (1) information indicating that the first slice of the set of slices is permitted to be accessed by the WTRU in the second TA.

In certain representative embodiments, the information indicating the set of slices which are requested by the WTRU may be provided as network slice selection assistance information (NSSAI).

In certain representative embodiments, the RA includes at least the first and second TAs.

In certain representative embodiments, the information indicating that the first slice of the set of slices is rejected may be provided as a single NSSAI (S-NSSAI).

In certain representative embodiments, the SSSA information may indicate that the first slice is accessible in TAs of the RA other than the first TA.

In certain representative embodiments, the first registration accept message may include a slice rejection cause code that indicates that the first slice is rejected only for the current TA and not for the entire RA.

In certain representative embodiments, the first registration accept message may include a service-area-limited NSSAI information element which indicates one or more of the slices of the set are accessible in less than all TAs of the RA.

In certain representative embodiments, the first registration request message may include information indicating that the WTRU understands or is capable of receiving SSSA information.

In some embodiments, the various procedures and examples provided above may be combined and/or modified to incorporate one or more additional features as described herein.

CONCLUSION

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

The foregoing embodiments are discussed, for simplicity, with regard to the terminology and structure of wireless communication capable devices, (e.g., radio wave emitters and receivers). However, the embodiments discussed are not limited to these systems but may be applied to other systems that use other forms of electromagnetic waves or non-electromagnetic waves such as acoustic waves.

It is also to be understood that the terminology used herein is for the purpose of describing particular embodiments only, and is not intended to be limiting. As used herein, the term "video" or the term "imagery" may mean any of a snapshot, single image and/or multiple images displayed over a time basis. As another example, when referred to herein, the terms "user equipment" and its abbreviation "UE", the term "remote" and/or the terms "head mounted display" or its abbreviation "HMD" may mean or include (i) a wireless transmit and/or receive unit (WTRU); (ii) any of a number of embodiments of a WTRU; (iii) a wireless-capable and/or wired-capable (e.g., tetherable) device configured with, inter alia, some or all structures and functionality of a WTRU; (iii) a wireless-capable and/or wired-capable device configured with less than all structures and functionality of a WTRU; or (iv) the like. Details of an example WTRU, which may be representative of any WTRU recited herein, are provided herein with respect to FIGS. 1A-1D. As another example, various disclosed embodiments herein supra and infra are described as utilizing a head mounted display. Those skilled in the art will recognize that a device other than the head mounted display may be utilized and some or all of the disclosure and various disclosed embodiments can be modified accordingly without undue experimentation. Examples of such other device may include a drone or other device configured to stream information for providing the adapted reality experience.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the method, apparatus and system provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices that include processors are noted. These devices may include at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM)) or non-volatile (e.g., Read-Only Memory (ROM)) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples include one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components included within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may include usage of the introductory phrases "at least one" and "one or more" to introduce claim recitations. However, the use of such phrases should not be construed to imply that the introduction of a claim recitation by the indefinite articles "a" or "an" limits any particular claim including such introduced claim recitation to embodiments including only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" is intended to include any number of items, including zero. Additionally, as used herein, the term "number" is intended to include any number, including zero. And the term "multiple", as used herein, is intended to be synonymous with "a plurality".

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, 16 or means-plus-function claim format, and any claim without the terms "means for" is not so intended.

What is claimed is:

1. A wireless transmit/receive unit (WTRU) comprising:
a processor and a transceiver which are configured to:
send a first registration request message which includes a slice-specific service area (SSSA) information support indication and a first requested network slice selection assistance information (NSSAI), wherein the first requested NSSAI includes a set of one or more single-NSSAIs (S-NSSAIs);
receive a first registration accept message, in response to the first registration request message, which includes information indicating (i) a first registration area (RA) and (ii) SSSA information indicating a first S-NSSAI, included in the first requested NSSAI, is rejected and a set of tracking areas (TAs), in in the first RA, which do not support the first S-NSSAI;
send, based on the WTRU moving to a TA, in the first RA, not included in the set of TAs, a second registration request message which includes information indicating a second requested NSSAI, wherein the second requested NSSAI includes at least the first S-NSSAI; and
receive a second registration accept message, in response to the second registration request message, which includes information indicating that at least the first S-NSSAI, included in the second requested NSSAI, is allowed.

2. The WTRU of claim 1, wherein the first registration accept message includes information indicating a second S-NSSAI, included in the first requested NSSAI, is allowed in the first RA.

3. The WTRU of claim 1, wherein the second registration accept message includes information indicating a second RA.

4. The WTRU of claim 1, wherein the first RA includes a plurality of TAs, and the plurality of TAs includes the set of TAs which do not support the first S-NSSAI.

5. The WTRU of claim 1, wherein the SSSA information support indication indicates the WTRU is capable to receive SSSA information, and the SSSA information support indication is included in a 5G mobility management (5GMM) core network capability information element of the first registration request message.

6. The WTRU of claim 1, wherein the SSSA information is included in a non-access stratum mobility management (NAS-MM) information element of the first registration accept message.

7. The WTRU of claim 1, wherein the second registration accept message is received by the WTRU in the TA, in the first RA, not included in the set of TAs.

8. The WTRU of claim 1, wherein the second registration accept message is received from a base station associated with the TA in the first RA, not included in the set of the TAs.

9. The WTRU of claim 1, wherein the processor and the transceiver are configured to:
determine that the WTRU has entered the TA, in the first RA, not included in the set of TAs prior to sending the second registration request message.

10. The WTRU of claim 1, wherein the SSSA information further indicates a third S-NSSAI, included in the first requested NSSAI, and a set of TAs, in the RA, which do not support the third S-NSSAI.

11. A method implemented by a wireless transmit/receive unit (WTRU), the method comprising:
sending a first registration request message which includes a slice-specific service area (SSSA) information support indication and a first requested network slice selection assistance information (NSSAI), wherein the first requested NSSAI includes a set of one or more single-NSSAIs (S-NSSAIs);
receiving a first registration accept message, in response to the first registration request message, which includes information indicating (i) a first registration area (RA) and (ii) SSSA information indicating a first S-NSSAI, included in the first requested NSSAI, is rejected and a set of first tracking areas (TAs), in the first RA, which do not support the first S-NSSAI;
sending, based on the WTRU moving to a TA, in the first RA, not included in the set of TAs, a second registration request message which includes information indicating a second requested NSSAI, wherein the second requested NSSAI includes at least the first S-NSSAI; and
receiving a second registration accept message, in response to the second registration request message, which includes information indicating that at least the first S-NSSAI, included in the second requested NSSAI, is allowed.

12. The method of claim 11, wherein the first registration accept message includes information indicating a second S-NSSAI, included in the first requested NSSAI, is allowed in the first RA.

13. The method of claim 11, wherein the second registration accept message includes information indicating a second RA.

14. The method of claim 11, wherein the first RA includes a plurality of TAs, and the plurality of TAs includes the set of TAs which do not support the first S-NSSAI.

15. The method of claim 11, wherein the SSSA information support indication indicates the WTRU is capable to receive SSSA information, and the SSSA information support indication is included in a 5G mobility management (5GMM) core network capability information element of the first registration request message.

16. The method of claim 11, wherein the SSSA information is included in a non-access stratum mobility management (NAS-MM) information element of the first registration accept message.

17. The method of claim 11, wherein the second registration accept message is received by the WTRU in the TA, in the first RA, not included in the set of TAs.

18. The method of claim 11, further comprising:
determining that the WTRU has entered the TA, in the first RA, not included in the set of TAs prior to sending the second registration request message.

19. The method of claim 11, wherein the SSSA information further indicates a third S-NSSAI, included in the first requested NSSAI, and a set of TAs, in the first RA, which do not support the third S-NSSAI.

20. A wireless transmit/receive unit (WTRU) comprising:
a processor and a transceiver which are configured to:
send a first registration request message which includes a slice-specific service area (SSSA) information support indication and a first requested network slice selection assistance information (NSSAI), wherein the first requested NSSAI includes a set of single-NSSAIs (S-NSSAIs);
receive a first registration accept message, in response to the first registration request message, which includes information indicating (i) a first registration area (RA) that includes a plurality of tracking areas (TAs), (ii) SSSA information indicating a first S-NSSAI, included in the first requested NSSAI, is rejected and a first subset of tracking areas (TAs), in the first RA, which do not support the first S-NSSAI, and a second S-NSSAI, included in the first requested NSSAI, and a second subset of TAs, in the first RA, which do not support the second S-NSSAI;
determine the WTRU has moved to a TA, in the first RA, not included in the set of TAs;
send, based on the WTRU moving to the TA, in the first RA, not included in the set of TAs, a second registration request message which includes information indicating a second requested NSSAI, wherein the second requested NSSAI includes at least the first S-NSSAI; and
receive a second registration accept message, in response to the second registration request message, which includes information indicating that at least the first S-NSSAI, included in the second requested NSSAI, is allowed,
wherein the SSSA information support indication is included in a 5G mobility management (5GMM) core network capability information element of the first registration request message, and
wherein the SSSA information is included in a non-access stratum mobility management (NAS-MM) information element of the first registration accept message.

* * * * *